(12) United States Patent  
Rosenberg

(10) Patent No.: US 7,519,537 B2  
(45) Date of Patent: Apr. 14, 2009

(54) METHOD AND APPARATUS FOR A VERBO-MANUAL GESTURE INTERFACE

(75) Inventor: Louis B. Rosenberg, Pismo Beach, CA (US)

(73) Assignee: Outland Research, LLC, Pismo Beach, CA (US)

( * ) Notice: Subject to any disclaimer, the term of this patent is extended or adjusted under 35 U.S.C. 154(b) by 580 days.

(21) Appl. No.: 11/246,050

(22) Filed: Oct. 7, 2005

(65) Prior Publication Data

US 2007/0033012 A1   Feb. 8, 2007

Related U.S. Application Data

(60) Provisional application No. 60/701,101, filed on Jul. 19, 2005.

(51) Int. Cl.
*G10L 21/00* (2006.01)

(52) U.S. Cl. .................. 704/275; 704/270; 704/271; 704/272

(58) Field of Classification Search .......... 704/270, 704/271, 272, 273, 276, E17.009, 275; 463/36, 463/37, 47; 379/52; 715/863; 276/148 B, 276/372, 381; 345/156, 158, 161

See application file for complete search history.

(56) References Cited

U.S. PATENT DOCUMENTS

| | | | |
|---|---|---|---|
| 4,018,121 A | 4/1977 | Chower | |
| 4,050,171 A | 9/1977 | Teach | |
| 4,054,749 A | 10/1977 | Suzuki | |
| 4,091,302 A | 5/1978 | Yamashita | |
| 4,337,529 A | 6/1982 | Morokawa | |

(Continued)

FOREIGN PATENT DOCUMENTS

DE          19650900          6/1998

(Continued)

OTHER PUBLICATIONS

Hernandez Jose L., Kyriakopoulos, N., Lindeman, R. A New Instrumented Approach For Translating American Sign Language Into Sound And Text. IEEE International Conference on Face and Gesture Recognition 2004, Seoul, Korea, May 2004.*

(Continued)

*Primary Examiner*—Talivaldis I Smits
*Assistant Examiner*—Edgar Guerra-Erazo
(74) *Attorney, Agent, or Firm*—Thomas F. Lebens; Sinsheimer Juhnke Lebens & McIvor, LLP

(57) ABSTRACT

An interface system including a manipulandum adapted to be moveable according to a manual gesture imparted by the user; a sensor adapted to detect a characteristic of the manual gesture imparted to the manipulandum and to generate a sensor signal representing the detected characteristic of the manual gesture; a microphone adapted to detect a characteristic of an utterance spoken by the user and to generate an audio signal representing the detected characteristic of the spoken utterance; and a control system adapted receive the generated sensor and audio signals and to transmit a command signal to an electronic device via a communication link, the command signal being based on the generated sensor and audio signals and the time synchronization between them.

12 Claims, 10 Drawing Sheets

U.S. PATENT DOCUMENTS

| | | |
|---|---|---|
| 4,360,345 A | 11/1982 | Hon |
| 4,430,595 A | 2/1984 | Nakasone |
| 4,490,810 A | 12/1984 | Hon |
| 4,712,101 A | 12/1987 | Culver |
| 4,788,983 A | 12/1988 | Brink |
| 4,823,634 A | 4/1989 | Culver |
| 4,868,549 A | 9/1989 | Affinito |
| 4,907,973 A | 3/1990 | Hon |
| 4,919,418 A | 4/1990 | Miller |
| 4,934,694 A | 6/1990 | McIntosh |
| 4,949,089 A | 8/1990 | Ruszkowski, Jr. |
| 4,983,901 A | 1/1991 | Lehmer |
| 5,047,918 A | 9/1991 | Schwartz et al. |
| 5,047,952 A * | 9/1991 | Kramer et al. ............... 704/271 |
| 5,149,084 A | 9/1992 | Dalebout et al. |
| 5,154,677 A | 10/1992 | Ito |
| 5,164,530 A | 11/1992 | Iwase |
| 5,179,792 A | 1/1993 | Brantingham |
| 5,185,561 A | 2/1993 | Good |
| 5,186,629 A | 2/1993 | Rohen |
| 5,189,355 A | 2/1993 | Larkins |
| 5,215,468 A | 6/1993 | Lauffer |
| 5,220,260 A | 6/1993 | Schuler |
| 5,267,942 A | 12/1993 | Saperston |
| 5,273,038 A | 12/1993 | Beavin |
| 5,290,205 A | 3/1994 | Densmore et al. |
| 5,296,846 A | 3/1994 | Ledley |
| 5,296,871 A | 3/1994 | Paley |
| 5,308,300 A | 5/1994 | Chino et al. |
| 5,335,188 A | 8/1994 | Brisson |
| 5,387,164 A | 2/1995 | Brown, Jr. |
| 5,437,289 A | 8/1995 | Liverance et al. |
| 5,449,002 A | 9/1995 | Goldman |
| 5,451,192 A | 9/1995 | Hefele |
| 5,491,546 A | 2/1996 | Wascher |
| 5,499,360 A | 3/1996 | Barbara et al. |
| 5,534,917 A | 7/1996 | MacDougall |
| 5,545,112 A | 8/1996 | Densmore et al. |
| 5,559,412 A | 9/1996 | Schuler |
| 5,572,201 A | 11/1996 | Graham et al. |
| 5,592,143 A | 1/1997 | Romney |
| 5,598,849 A | 2/1997 | Browne |
| 5,614,687 A | 3/1997 | Yamada et al. |
| 5,629,594 A | 5/1997 | Jacobus |
| 5,634,051 A | 5/1997 | Thomson |
| 5,643,087 A | 7/1997 | Marcus et al. |
| 5,666,138 A | 9/1997 | Culver |
| 5,690,582 A | 11/1997 | Ulrich et al. |
| 5,699,441 A * | 12/1997 | Sagawa et al. ............... 382/100 |
| 5,701,140 A | 12/1997 | Rosenberg |
| 5,704,791 A | 1/1998 | Gillio |
| 5,709,219 A | 1/1998 | Chen |
| 5,721,566 A | 2/1998 | Rosenberg |
| 5,724,264 A | 3/1998 | Rosenberg |
| 5,728,960 A | 3/1998 | Sitrick |
| 5,731,804 A | 3/1998 | Rosenberg |
| 5,742,278 A | 4/1998 | Chen |
| 5,747,714 A | 5/1998 | Kniest et al. |
| 5,754,023 A | 5/1998 | Roston |
| 5,755,577 A | 5/1998 | Gillio |
| 5,767,839 A | 6/1998 | Rosenberg |
| 5,769,640 A | 6/1998 | Jacobus |
| 5,791,908 A | 8/1998 | Gillio |
| 5,794,361 A | 8/1998 | Sadler |
| 5,800,177 A | 9/1998 | Gillio |
| 5,800,178 A | 9/1998 | Gillio |
| 5,807,267 A | 9/1998 | Bryars et al. |
| 5,813,142 A | 9/1998 | Demon |
| 5,821,920 A | 10/1998 | Rosenberg |
| 5,825,308 A | 10/1998 | Rosenberg |
| 5,828,197 A | 10/1998 | Martin |
| 5,839,901 A | 11/1998 | Karkanen |
| 5,857,939 A | 1/1999 | Kaufman |
| 5,870,740 A | 2/1999 | Rose et al. |
| 5,882,206 A | 3/1999 | Gillio |
| 5,889,670 A | 3/1999 | Schuler |
| 5,889,672 A | 3/1999 | Schuler |
| 5,890,116 A * | 3/1999 | Itoh et al. ............... 704/260 |
| 5,890,128 A | 3/1999 | Diaz et al. |
| 5,890,995 A | 4/1999 | Bobick et al. |
| 5,890,997 A | 4/1999 | Roth |
| 5,897,437 A | 4/1999 | Nishiumi |
| 5,916,063 A | 6/1999 | Alessandri |
| 5,928,248 A | 7/1999 | Acker |
| 5,931,763 A | 8/1999 | Alessandri |
| 5,941,837 A | 8/1999 | Amano et al. |
| 5,944,633 A | 8/1999 | Wittrock |
| 5,952,596 A | 9/1999 | Kondo |
| 5,953,693 A * | 9/1999 | Sakiyama et al. ............... 704/3 |
| 5,989,188 A | 11/1999 | Birkhoelzer et al. |
| 6,013,007 A | 1/2000 | Root |
| 6,024,576 A | 2/2000 | Bevirt et al. |
| 6,088,017 A | 7/2000 | Tremblay |
| 6,096,004 A | 8/2000 | Meglan |
| 6,106,301 A | 8/2000 | Merril |
| 6,111,577 A | 8/2000 | Zilles |
| 6,119,114 A | 9/2000 | Smadja |
| 6,154,201 A | 11/2000 | Levin et al. |
| 6,160,489 A | 12/2000 | Perry |
| 6,177,905 B1 | 1/2001 | Welch |
| 6,192,340 B1 | 2/2001 | Abecassis |
| 6,199,067 B1 | 3/2001 | Geller |
| 6,211,861 B1 | 4/2001 | Rosenberg et al. |
| 6,230,047 B1 | 5/2001 | McHugh |
| 6,239,501 B1 | 5/2001 | Komarechka |
| 6,244,742 B1 | 6/2001 | Yamada |
| 6,244,988 B1 | 6/2001 | Delman |
| 6,246,362 B1 | 6/2001 | Tsubata |
| 6,251,048 B1 | 6/2001 | Kaufman |
| 6,255,799 B1 | 7/2001 | Le et al. |
| 6,256,011 B1 | 7/2001 | Culver |
| 6,266,612 B1 | 7/2001 | Dussell |
| 6,285,317 B1 | 9/2001 | Ong |
| 6,287,262 B1 | 9/2001 | Amano et al. |
| 6,292,747 B1 | 9/2001 | Amro et al. |
| 6,298,323 B1 | 10/2001 | Kaemmerer |
| 6,300,938 B1 | 10/2001 | Culver |
| 6,304,520 B1 | 10/2001 | Watanabe |
| 6,314,094 B1 | 11/2001 | Boys et al. |
| 6,315,694 B1 | 11/2001 | Osu et al. |
| 6,323,412 B1 | 11/2001 | Loo |
| 6,351,710 B1 | 2/2002 | Mays |
| 6,366,272 B1 | 4/2002 | Rosenberg |
| 6,376,971 B1 | 4/2002 | Pelrine |
| 6,401,027 B1 | 6/2002 | Xu et al. |
| 6,401,037 B1 | 6/2002 | Muller et al. |
| 6,411,896 B1 | 6/2002 | Shuman et al. |
| 6,429,846 B2 | 8/2002 | Rosenberg |
| 6,470,207 B1 | 10/2002 | Simon |
| 6,470,302 B1 | 10/2002 | Cunningham |
| 6,477,239 B1 * | 11/2002 | Ohki et al. ............... 379/52 |
| 6,497,638 B1 | 12/2002 | Shea |
| 6,498,982 B2 | 12/2002 | Bellesfield et al. |
| 6,503,173 B2 | 1/2003 | Clem |
| 6,506,142 B2 | 1/2003 | Itoh et al. |
| 6,515,593 B1 | 2/2003 | Stark et al. |
| 6,515,651 B1 | 2/2003 | Berstis |
| 6,522,292 B1 | 2/2003 | Ellenby et al. |
| 6,526,411 B1 | 2/2003 | Ward |
| 6,527,674 B1 | 3/2003 | Clem |
| 6,539,232 B2 | 3/2003 | Hendrey et al. |
| 6,563,487 B2 | 5/2003 | Martin |
| 6,564,210 B1 | 5/2003 | Korda et al. |
| 6,571,200 B1 | 5/2003 | Mault |

| Patent | Date | Inventor |
|---|---|---|
| 6,572,511 B1 | 6/2003 | Volpe |
| 6,598,707 B2 | 7/2003 | Nakagaki et al. |
| 6,607,493 B2 | 8/2003 | Song |
| 6,618,593 B1 | 9/2003 | Drutman et al. |
| 6,623,427 B2 | 9/2003 | Mandigo |
| 6,626,728 B2 * | 9/2003 | Holt .................. 446/219 |
| 6,636,835 B2 | 10/2003 | Ragsdale-Elliott et al. |
| 6,640,187 B1 | 10/2003 | Chenault |
| 6,655,817 B2 | 12/2003 | Devlin |
| 6,657,116 B1 | 12/2003 | Gunnerson |
| 6,659,916 B1 | 12/2003 | Shea |
| 6,665,644 B1 | 12/2003 | Kanevsky et al. |
| 6,671,736 B2 | 12/2003 | Virine et al. |
| 6,680,675 B1 | 1/2004 | Suzuki |
| 6,686,531 B1 | 2/2004 | Pennock et al. |
| 6,686,911 B1 | 2/2004 | Levin |
| 6,687,535 B2 | 2/2004 | Hautala et al. |
| 6,697,044 B2 | 2/2004 | Shahoian |
| 6,697,048 B2 | 2/2004 | Rosenberg et al. |
| 6,781,289 B2 | 2/2004 | Levin |
| 6,702,719 B1 | 3/2004 | Brown et al. |
| 6,721,706 B1 | 4/2004 | Strubbe et al. |
| 6,732,090 B2 | 5/2004 | Shanahan et al. |
| 6,735,568 B1 | 5/2004 | Buckwalter et al. |
| 6,740,007 B2 | 5/2004 | Gordon et al. |
| 6,749,537 B1 | 6/2004 | Hickman |
| 6,768,066 B2 | 7/2004 | Wehrenberg |
| 6,768,246 B2 | 7/2004 | Pelrine |
| 6,772,026 B2 | 8/2004 | Bradbury et al. |
| 6,783,482 B2 | 8/2004 | Oglesby et al. |
| 6,786,848 B2 | 9/2004 | Yamashita et al. |
| 6,790,178 B1 | 9/2004 | Mault et al. |
| 6,793,607 B2 | 9/2004 | Neil |
| 6,801,837 B2 | 10/2004 | Carlstedt et al. |
| 6,804,643 B1 | 10/2004 | Kiss |
| 6,808,472 B1 | 10/2004 | Hickman |
| 6,808,473 B2 | 10/2004 | Hisano |
| 6,812,394 B2 | 11/2004 | Weissflog |
| 6,812,624 B1 | 11/2004 | Pei |
| 6,822,635 B2 | 11/2004 | Shahoian |
| 6,824,502 B1 | 11/2004 | Huang |
| 6,829,599 B2 | 12/2004 | Chidlovskii |
| 6,832,109 B2 | 12/2004 | Nissila |
| 6,836,744 B1 | 12/2004 | Asphahani et al. |
| 6,858,970 B2 | 2/2005 | Malkin |
| 6,863,220 B2 | 3/2005 | Selker |
| 6,863,641 B1 | 3/2005 | Brown et al. |
| 6,866,613 B1 | 3/2005 | Brown et al. |
| 6,871,142 B2 | 3/2005 | Kumada et al. |
| 6,879,284 B2 | 4/2005 | Dufek |
| 6,882,086 B2 | 4/2005 | Kornbluh |
| 6,885,362 B2 | 4/2005 | Suomela |
| 6,888,457 B2 | 5/2005 | Wilkinson et al. |
| 6,906,533 B1 | 6/2005 | Yoshida |
| 6,906,643 B2 | 6/2005 | Samadani |
| 6,915,295 B2 | 7/2005 | Okamoto et al. |
| 6,917,373 B2 | 7/2005 | Vong et al. |
| 6,921,351 B1 | 7/2005 | Hickman |
| 6,929,481 B1 | 8/2005 | Alexander |
| 6,941,324 B2 | 9/2005 | Plastina et al. |
| 6,950,695 B2 | 9/2005 | Chen |
| 6,955,630 B2 | 10/2005 | Sher |
| 6,956,538 B2 | 10/2005 | Moore |
| 6,965,842 B2 * | 11/2005 | Rekimoto .................. 702/150 |
| 6,970,088 B2 | 11/2005 | Kovach |
| 6,978,684 B2 | 12/2005 | Nurse |
| 6,982,697 B2 | 1/2006 | Wilson |
| 6,982,700 B2 | 1/2006 | Rosenberg et al. |
| 6,983,139 B2 | 1/2006 | Dowling |
| 6,985,143 B2 | 1/2006 | Pharr |
| 6,986,320 B2 | 1/2006 | Shelton |
| 6,987,221 B2 | 1/2006 | Platt |
| 6,991,586 B2 | 1/2006 | Lapcevic |
| 6,997,852 B2 | 2/2006 | Watterson et al. |
| 7,003,122 B2 | 2/2006 | Chen |
| 7,007,001 B2 | 2/2006 | Oliver et al. |
| 7,012,593 B2 * | 3/2006 | Yoon et al. .................. 345/156 |
| 7,022,047 B2 | 4/2006 | Cohen et al. |
| 7,023,423 B2 | 4/2006 | Rosenberg |
| 7,027,823 B2 | 4/2006 | Mikuni |
| 7,031,875 B2 | 4/2006 | Ellenby et al. |
| 7,044,891 B1 | 5/2006 | Rivera |
| 7,046,588 B2 | 5/2006 | Heo |
| 7,056,265 B1 | 6/2006 | Shea |
| 7,060,006 B1 | 6/2006 | Watterson et al. |
| 7,060,008 B2 | 6/2006 | Watterson et al. |
| 7,070,539 B2 | 7/2006 | Brown et al. |
| 7,089,264 B1 | 8/2006 | Guido |
| 7,092,964 B1 | 8/2006 | Dougherty et al. |
| 7,097,588 B2 | 8/2006 | Watterson et al. |
| 7,100,835 B2 | 9/2006 | Selker |
| 7,107,706 B1 | 9/2006 | Bailey et al. |
| 7,115,076 B2 | 10/2006 | Oglesby et al. |
| 7,128,693 B2 | 10/2006 | Brown et al. |
| 7,138,575 B2 | 11/2006 | Childs et al. |
| 7,156,773 B2 | 1/2007 | Takai et al. |
| 7,163,490 B2 | 1/2007 | Chen |
| 7,166,062 B1 | 1/2007 | Watterson et al. |
| 7,177,672 B2 | 2/2007 | Nissila |
| 7,181,438 B1 | 2/2007 | Szabo |
| 7,186,270 B2 | 3/2007 | Elkins |
| 7,199,708 B2 | 4/2007 | Terauchi et al. |
| 7,204,041 B1 | 4/2007 | Bailey et al. |
| 7,207,935 B1 | 4/2007 | Lipo |
| 7,219,449 B1 | 5/2007 | Hoffberg et al. |
| 7,225,565 B2 | 6/2007 | DiBenedetto et al. |
| 7,227,071 B2 | 6/2007 | Tagawa et al. |
| 7,229,416 B2 | 6/2007 | Chen |
| 7,232,416 B2 | 6/2007 | Czernicki |
| 7,249,126 B1 | 7/2007 | Ginsburg et al. |
| 7,254,516 B2 | 8/2007 | Case et al. |
| 7,283,997 B1 | 10/2007 | Howard et al. |
| RE39,906 E | 11/2007 | Roston et al. |
| 7,293,060 B2 | 11/2007 | Komsi |
| 7,310,676 B2 | 12/2007 | Bourne |
| 7,310,895 B2 | 12/2007 | Whittlesey et al. |
| 7,312,766 B1 | 12/2007 | Edwards |
| 7,312,785 B2 | 12/2007 | Tsuk et al. |
| 7,342,649 B2 | 3/2008 | Waibel |
| 7,344,508 B2 | 3/2008 | Surina |
| 7,348,967 B2 | 3/2008 | Zadesky et al. |
| 7,350,787 B2 | 4/2008 | Voss |
| 7,354,380 B2 | 4/2008 | Volpe, Jr. |
| 7,359,624 B2 | 4/2008 | Adams et al. |
| 7,373,820 B1 | 5/2008 | James |
| 7,394,405 B2 | 7/2008 | Godden |
| 7,395,614 B1 | 7/2008 | Bailey et al. |
| 2001/0003542 A1 | 6/2001 | Kita |
| 2001/0004622 A1 | 6/2001 | Alessandri |
| 2001/0020242 A1 | 9/2001 | Gupta |
| 2001/0041647 A1 | 11/2001 | Itoh et al. |
| 2002/0016786 A1 | 2/2002 | Pitkow et al. |
| 2002/0054060 A1 | 5/2002 | Schena |
| 2002/0059296 A1 | 5/2002 | Hayashi |
| 2002/0078045 A1 | 6/2002 | Dutta |
| 2002/0091049 A1 | 7/2002 | Hisano |
| 2002/0091796 A1 | 7/2002 | Higginson |
| 2002/0116476 A1 | 8/2002 | Eyal et al. |
| 2002/0133418 A1 | 9/2002 | Hammond et al. |
| 2002/0142701 A1 | 10/2002 | Rosenberg |
| 2002/0152077 A1 * | 10/2002 | Patterson .................. 704/271 |
| 2002/0186221 A1 | 12/2002 | Bell |
| 2003/0009497 A1 | 1/2003 | Yu |
| 2003/0011467 A1 | 1/2003 | Suomela |
| 2003/0018527 A1 | 1/2003 | Filepp |
| 2003/0033287 A1 | 2/2003 | Shanahan et al. |

| | | |
|---|---|---|
| 2003/0041105 A1 | 2/2003 | Patrick |
| 2003/0047683 A1 | 3/2003 | Kaushal |
| 2003/0069077 A1 | 4/2003 | Korienek |
| 2003/0076301 A1 | 4/2003 | Tsuk et al. |
| 2003/0089218 A1 | 5/2003 | Gang et al. |
| 2003/0110038 A1 | 6/2003 | Sharma |
| 2003/0115193 A1 | 6/2003 | Okamoto et al. |
| 2003/0132301 A1 | 7/2003 | Selker |
| 2003/0135490 A1 | 7/2003 | Barrett et al. |
| 2003/0187837 A1 | 10/2003 | Cutliss |
| 2003/0193572 A1 | 10/2003 | Wilson |
| 2003/0195884 A1 | 10/2003 | Boyd et al. |
| 2003/0217007 A1 | 11/2003 | Fukushima |
| 2003/0220917 A1 | 11/2003 | Copperman et al. |
| 2003/0236582 A1 | 12/2003 | Zamir et al. |
| 2004/0012506 A1 | 1/2004 | Fujiwara |
| 2004/0015714 A1 | 1/2004 | Abraham et al. |
| 2004/0017482 A1 | 1/2004 | Weitman |
| 2004/0019588 A1 | 1/2004 | Doganata et al. |
| 2004/0025563 A1 | 2/2004 | Stierle |
| 2004/0068486 A1 | 4/2004 | Chidlovskii |
| 2004/0097806 A1 | 5/2004 | Hunter |
| 2004/0102684 A1 | 5/2004 | Kawanishi |
| 2004/0103087 A1 | 5/2004 | Mukherjee et al. |
| 2004/0114129 A1 | 6/2004 | Gogolla |
| 2004/0124248 A1 | 7/2004 | Selker |
| 2004/0125073 A1 | 7/2004 | Potter |
| 2004/0164971 A1 | 8/2004 | Hayward |
| 2004/0166937 A1 | 8/2004 | Rothschild |
| 2004/0204240 A1* | 10/2004 | Barney ............... 463/36 |
| 2004/0215469 A1 | 10/2004 | Fukushima |
| 2004/0219961 A1 | 11/2004 | Ellenby |
| 2004/0224638 A1 | 11/2004 | Fadell et al. |
| 2004/0225519 A1 | 11/2004 | Martin |
| 2004/0248653 A1 | 12/2004 | Barros |
| 2004/0252397 A1 | 12/2004 | Hodge et al. |
| 2005/0012611 A1 | 1/2005 | Osman |
| 2005/0021470 A1 | 1/2005 | Martin et al. |
| 2005/0039206 A1 | 2/2005 | Opdycke |
| 2005/0049113 A1 | 3/2005 | Yueh |
| 2005/0071328 A1 | 3/2005 | Lawrence |
| 2005/0080786 A1 | 4/2005 | Fish |
| 2005/0096047 A1 | 5/2005 | Haberman et al. |
| 2005/0107218 A1 | 5/2005 | Chuang et al. |
| 2005/0107688 A1 | 5/2005 | Strommer |
| 2005/0126370 A1 | 6/2005 | Takai |
| 2005/0129253 A1 | 6/2005 | Chen |
| 2005/0130802 A1 | 6/2005 | Kinnunen et al. |
| 2005/0134479 A1 | 6/2005 | Isaji |
| 2005/0139660 A1 | 6/2005 | Maxymych et al. |
| 2005/0141729 A1 | 6/2005 | Kanzaki |
| 2005/0143173 A1* | 6/2005 | Barney et al. ............ 463/37 |
| 2005/0149213 A1 | 7/2005 | Guzak et al. |
| 2005/0149499 A1 | 7/2005 | Franz et al. |
| 2005/0154636 A1 | 7/2005 | Hildinger et al. |
| 2005/0174975 A1 | 8/2005 | Mgrdechian et al. |
| 2005/0182564 A1 | 8/2005 | Kim |
| 2005/0184878 A1 | 8/2005 | Grold et al. |
| 2005/0197237 A1 | 9/2005 | Chen |
| 2005/0210419 A1* | 9/2005 | Kela et al. ............... 715/863 |
| 2005/0212749 A1 | 9/2005 | Marvit et al. |
| 2005/0222981 A1 | 10/2005 | Lawrence et al. |
| 2005/0222989 A1 | 10/2005 | Haveliwala et al. |
| 2005/0233859 A1 | 10/2005 | Takai et al. |
| 2005/0233861 A1 | 10/2005 | Hickman et al. |
| 2005/0234638 A1 | 10/2005 | Ogaki |
| 2005/0240342 A1 | 10/2005 | Ishihara |
| 2005/0261609 A1 | 11/2005 | Collings et al. |
| 2005/0266961 A1 | 12/2005 | Shum et al. |
| 2005/0278317 A1 | 12/2005 | Gross et al. |
| 2005/0286546 A1 | 12/2005 | Basseli et al. |
| 2006/0004512 A1 | 1/2006 | Herbst |
| 2006/0017692 A1* | 1/2006 | Wehrenberg et al. ........ 345/156 |
| 2006/0020177 A1 | 1/2006 | Seo et al. |
| 2006/0022955 A1 | 2/2006 | Kennedy |
| 2006/0026521 A1 | 2/2006 | Hotelling et al. |
| 2006/0052132 A1 | 3/2006 | Naukkarinen |
| 2006/0060068 A1 | 3/2006 | Hwang |
| 2006/0079800 A1 | 4/2006 | Martikka et al. |
| 2006/0084551 A1 | 4/2006 | Volpe, Jr. |
| 2006/0095412 A1 | 5/2006 | Zito et al. |
| 2006/0097991 A1 | 5/2006 | Hotelling et al. |
| 2006/0098772 A1 | 5/2006 | Reho et al. |
| 2006/0101377 A1 | 5/2006 | Toyama et al. |
| 2006/0102171 A1 | 5/2006 | Gavish |
| 2006/0107822 A1 | 5/2006 | Bowen |
| 2006/0111621 A1 | 5/2006 | Coppi et al. |
| 2006/0136173 A1 | 6/2006 | Case et al. |
| 2006/0161621 A1 | 7/2006 | Rosenberg |
| 2006/0164382 A1 | 7/2006 | Kulas |
| 2006/0167576 A1 | 7/2006 | Rosenberg |
| 2006/0167943 A1 | 7/2006 | Rosenberg |
| 2006/0169125 A1 | 8/2006 | Ashkenazi |
| 2006/0173828 A1 | 8/2006 | Rosenberg |
| 2006/0173837 A1 | 8/2006 | Berstis et al. |
| 2006/0188109 A1 | 8/2006 | Makino et al. |
| 2006/0189386 A1 | 8/2006 | Rosenberg |
| 2006/0229163 A1 | 10/2006 | Waters |
| 2006/0243120 A1 | 11/2006 | Takai |
| 2006/0253210 A1 | 11/2006 | Rosenberg |
| 2006/0256082 A1 | 11/2006 | Cho |
| 2006/0276919 A1 | 12/2006 | Shirai |
| 2006/0288846 A1 | 12/2006 | Logan |
| 2007/0021269 A1 | 1/2007 | Shum |
| 2007/0027000 A1 | 2/2007 | Shirai |
| 2007/0044641 A1 | 3/2007 | McKinney et al. |
| 2007/0060446 A1 | 3/2007 | Asukai |
| 2007/0074618 A1 | 4/2007 | Vergo |
| 2007/0074619 A1 | 4/2007 | Vergo |
| 2007/0079691 A1 | 4/2007 | Turner |
| 2007/0103431 A1 | 5/2007 | Tabatowski-Bush |
| 2007/0113725 A1 | 5/2007 | Oliver |
| 2007/0145680 A1 | 6/2007 | Rosenberg |
| 2007/0156677 A1 | 7/2007 | Szabo |
| 2007/0173377 A1 | 7/2007 | Jamsen et al. |
| 2007/0174416 A1 | 7/2007 | Waters |
| 2007/0198182 A1 | 8/2007 | Singh |
| 2007/0236493 A1 | 10/2007 | Horiuchi |
| 2007/0271228 A1 | 11/2007 | Querel |
| 2008/0005075 A1 | 1/2008 | Horvitz et al. |
| 2008/0016040 A1 | 1/2008 | Jones et al. |
| 2008/0016218 A1 | 1/2008 | Jones et al. |
| 2008/0147217 A1 | 6/2008 | Chung |

FOREIGN PATENT DOCUMENTS

| | | |
|---|---|---|
| WO | WO-02/073818 | 9/2002 |
| WO | WO2006864 | 8/2006 |

OTHER PUBLICATIONS

Hernandez-Rebollar et al. ("A Multi-Class Pattern Recognition System for Practical Finger Spelling Translation," Proceedings of International Conference on Multimodal Interfaces, IEEE 2002, 185-190).*

Kramer, J., and Leifer, L., The Talking Glove: An Expressive and Receptive Verbal Communication Aid for the Deaf, Deaf-Blind, and Nonvocal. SIGCAPH 39, pp. 12-15 (spring 1988).*

Ciger et al. "The magic wand" In: Proceedings of Spring Conference on Computer Graphics 2003, Budmerice, Slovak Republic; 2003. p. 132-8.*

EIC_Search.*

Rosenberg, "U.S. Appl. No. 11/267,079", (Nov. 3, 2005).

McKinney and Moelants, et al., "Deviations from the Resonance Theory of Temp Induction", *published at the Conference on Interdisciplinary Musicology*, et al=Dirk Moelands,(2004).

Rosenberg, "U.S. Appl. No. 11/619,605", (Jan. 3, 2007).

Rosenberg, "U.S. Appl. No. 11/610,494", (Dec. 13, 2006).
Rosenberg, "U.S. Appl. No. 11/562,036", (Nov. 21, 2006).
Rosenberg, "U.S. Appl. No. 11/282,379", (Aug. 17, 2006).
Rosenberg, "U.S. Appl. No. 11/298,797", (Aug. 3, 2006).
Rosenberg, "U.S. Appl. No. 11/341,021", (Aug. 3, 2006).
Rosenberg, "U.S. Appl. No. 11/383,197", (Aug. 31, 2006).
Reinhold, Ross "Applications of Myers-Briggs Type Indicator, Personality Type", available at http://www.personalitypathways.com/ last visited Jun. 15, 2007.
"Human Metrics: Jung Typology Test", available at http://www.humanmetrics.com/cgi-win/JTypes2.asp last visited Jun. 15, 2007.
Rosenberg, "U.S. App. No. 11/260,000", (Oct. 26, 2005).
Rosenberg, "U.S. Appl. No. 11/299,096", (Dec. 9, 2005).
Rosenberg, "U.S. Appl. No. 11/315,762", (Dec. 21, 2005).
Rosenberg, "U.S. Appl. No. 11/341,025", (Jan. 27, 2006).
Rosenberg, "U.S. Appl. No. 11/383,195", (Aug. 10, 2006).
Rosenberg, "U.S. Appl. No. 11/422,065", (Aug. 24, 2006).
Rosenberg, "U.S. Appl. No. 11/425,981", (Jun. 22, 2007).
Rosenberg, "U.S. Appl. No. 11/428,341", (Oct. 12, 2006).
Wu and Childers, "Gender Recognition from Speech Part I: Coarse Analysis", (1991).
Wu and Childers, "Gender Recognition from Speech Part II: Fine Analysis", (1991).
Brin and Page, "The Anatomy of a Large-Scale Hypertextual Search Engine", *Stanford University*, 1998, (1998).
Hayashi, J et al., "A Method for Estimating and Modeling Age and Gender Using Facial Image Processing", (2001).
Schotz, "Automatic prediction of speaker age using CART", (2003).
Castrillon, et al., "Identity and Gender Recognition Using the ENCARA Real-Time Face Detector", *CAEPIA*, (Nov. 2003).
"www.wwmx.org", First visited in May 2005.
Office Action from U.S. Appl. No. 11/282,379 dated Sep. 18, 2007.
Kornbluh, et al., "High-field Electrostriction of Elastomeric Polymer Dielectrics for Actuation", SPIE Conference on Electroactive Polymer Actuators and Devices, (Mar. 1999).
Kawahara, et al., "Designing a Universal Remote Control for the Ubiquitous Computing Environment", *EE Time*, 2003.
Abrial, et al., "A New Contactless Smartcard IC Using an On-Chip Antenna and an Asynchronous Micro-controller", (2001).
Rosenberg, "U.S. Appl. No. 11/341,100", (Jan. 27, 2006).
Rosenberg, "U.S. Appl. No. 11/278,120", (Oct. 5, 2006).
Morhring, et al., "Video See-Through AR on Consumer Cell-Phones", (Mar. 2004).
Gordon, et al., "Silicon Optical Navigation", (2003).
"Remotely Operated Vehicles Seaeye Falcon", www.roperresources.com, (May 2002).
"Remotely Operated Vehicle", www.seabotix.com/products/lbv150.htm, (Dec. 2001).
"Unmanned Aircraft Systems", www.baiaerosystems.com, (1985).
"www.gesturetek.com", (Jul. 1996).
"www.reactrix.com", (2002).
Office Action from U.S. Appl. No. 11/422,065 dated Mar. 3, 2000.
Office Action from U.S. Appl. No. 11/422,065 dated Aug. 31, 2007.
Rosenberg, "U.S. Appl. No. 11/749,134", (May 15, 2007).
Rosenberg, "U.S. Appl. No. 11/749,137", (May 15, 2007).
Rosenberg, "U.S. Appl. No. 11/762,017", (Oct. 4, 2007).
Rosenberg, "U.S. Appl. No. 11/772,803", (Jul. 12, 2007).
Rosenberg, "U.S. Appl. No. 11/846,530", (Aug. 29, 2007).
Rosenberg, "U.S. Appl. No. 11/851,340", (Sep. 6, 2007).
Rosenberg, "U.S. Appl. No. 11/841,868", (Aug. 20, 2007).
Rosenberg, "U.S. Appl. No. 11/461,375", (Nov. 9, 2006).
Rosenberg, "U.S. Appl. No. 11/555,784", (May 24, 2007).
Rosenberg, "U.S. Appl. No. 11/563,610", (Jun. 28, 2007).
Rosenberg, "U.S. Appl. No. 11/697,706", (Aug. 16, 2007).
Rosenberg, "U.S. Appl. No. 11/618,858", (Jun. 14, 2007).
Rosenberg, "U.S. Appl. No. 11/676,298", (Jul. 5, 2007).
Rosenberg, "U.S. Appl. No. 11/697,732", (Apr. 8, 2007).
Rosenberg. "U.S. Appl. No. 11/744,879", (Sep. 20, 2007).
Rosenberg, "U.S. Appl. No. 11/775,314", (Jul. 30, 2007).
"Bodybug Calorie Management System", downloaded from www.ubergizmo.com/15/archives/2005/03/boddybug_calori.html on Jul. 9, 2007, (Mar. 18, 2005).

"www.fitlinxx.com", downloaded from www.fitlinxx.com/brand/about_tour3.htm on Jul. 9, 2007 (2003).
"YMCA", downloaded from www.ymcamidpen.org/textpage.php?b=2&p=fitlinxx on Jul. 10, 2007, (2003).
DeMartini, Marilyn "Cyber Fitness", downloaded from www.physicalmag.com/articlesTemp.as?dept=14&articleID=1812 on Jul. 10, 2007, (Feb. 18, 2001).
Munro, Aria "eNewsChannels", downloaded from enewschannels.com/20070106enc582-025321.php on Aug. 5, 2007, (Jul. 1, 2007).
Oliver, Nuria et al,. "Enhancing Exercise Performance through Real-time Phsiological Monitoring and Music: A User Study", *Proceedings of Pervasive Health 2006*, Innsbruck, Austria, Nov. 2006, et all=Lucas Keger-Stckles.
Betlyon, Jim "Omni Fitness Equipment Stores Integrate Physical Genius Online Fitness Tools", downloaded from www.physicalgenius.com on Aug. 5, 2007, (Apr. 19, 2000).
"Tune Your Run", *Apple Computer/Nike*, downloaded from www.apple.com on Jun. 28, 2006.
Nintendo, "Kirby's Tilt N' Tumble", downloaded from www.nintendo.com; Nov. 14, 2006; 2 pages.
Cook, Perry et al., "Using DSP-Based Parametric Physical Syntheses Models to Study Human Sound Perception", *2003 IEEE Workshop on Applications of Signal Processing to Audio and Acoustics*.
"Yahoo media player", downloaded from www.yahoo.com on Sep. 19, 2006. Not admitted as prior art.
McKinney and Moelants, "Extracting the Perceptual Tempo from Music", *published at the ISMIR 2004 5th International Conference on Music Information Retrieval*, (2004).
"PCDJ Red Virtual Rack Module", *by Visiosonic of Clearwater, Fl.* Downloaded from www.visiosonic.com on Jun. 27, 2006.
"Beat rates per minute", downloaded from www.bpmlist.com on Jun. 27, 2006, *Lulu Publishing*, ISBN 1-4116-4211-2.
Metzger, Christian et al., "FreeDigiter: A Contact-free Device for Gesture Control", *IEEE 8th International Symposium on Wearable Computers*, (Nov. 4, 2004).
"Jukebox Without Quarters", *Business Opportunities Weblog*, http://www.business-opportunitiesbix/2007/03/30/jukebox-without-quarters/, cited Mar. 30, 2007, printed May 22, 2007,(May 30, 2007), 2 pages.
Rosenberg, "U.S. Appl. No. 11/551,702", (Oct. 20, 2006).
Office Action from U.S. Appl. No. 11/298,797 dated Jan. 9, 2008.
Office Action from U.S. Appl. No. 11/341,021 dated Jan. 18, 2008.
"Total Immersion", *D'Fusion Software*, 2004.
Rosenberg, Louis "Virtual Fixtures: perceptual Overlays Enchance Operator Performance in Telepresence Tasks", *Ph.D. Dissertation, Stanford University*, (Jun. 1994).
Rosenberg, Louis "A force Feedback Programming Primer", *Immersion Corporation*, (1997).
"www.confluence.org", first visited May 2005.
Rosenberg, "U.S. Appl. No. 11/772,808", (Jul. 2, 2007).
Rosenberg, "U.S. Appl. No. 11/223,368", (Sep. 9, 2005).
Rosenberg, "U.S. Appl. No. 11/285,534", (Nov. 22, 2005).
Rosenberg, "U.S. Appl. No. 11/533,037", (Sep. 19, 2006).
Castelli, et al., "Habitat Telemonitoring System Based on the Sound Surveillance", *et al=Vacher, Istrate, Besacier and Serignat*.
Martin, Keith D., "Sound-Source Recognition: A Theory and Computational Model", *1999 doctoral dissertation from MIT*, (1999).
Casey, Michael "MPEG-7 Sound-Recognition Tools", *IEEE Transactions on Circuits and Systems for Video Technology*, vol. 11, No. 6, Jun. 2001.
Shahinpoor, Mohsen "Electro-mechanics of ionoelastic beams as electrically-controllable artificial muscles", *SPIE Conference on Electroactive Polymer Actuators and Devices, SPEE* vol. 3669, 1999.
Oguro, K et al., "Polymer Electrolyte Actuator with Gold Electrodes", *SPIE Conference on Electroactive Polymer Actuators and Devices, SPEE* vol. 3669, 1999.
Lumia, R et al., "Microgripper device using electo-active polymers", *SPIE Conference on Electroactive Polymer Actuators and Devices, SPEE* vol. 3669, 1999, (Mar. 1999).
Rosenberg, "U.S. Appl. No. 11/298,434", (Dec. 9, 2005).
Rosenberg, "U.S. Appl. No. 11/427,320", (Jun. 28, 2006).
Rosenberg, "U.S. Appl. No. 11/626,355", (Jan. 23, 2007).
Rosenberg. "U.S. Appl. No. 11/561,981", (Nov. 21, 2006).

Hotelling, et al., "U.S. Appl. No. 10/840,862", (May 6, 2004).
Rosenberg, "U. S. Appl. No. 11/535,417", (Sep. 26, 2006).
Murray, et al., "Underwater Telerobotics and Virtual Reality: A New Partnership", *NCCOSC RDT&E Division*; Jun. 20, 1996; pp. 1-10; San Diego CA, (Jun. 20, 1996), 1-10.
Rosenberg, "U.S. Appl. No. 11/427,325", (Jun. 28, 2006).
Rosenberg, "U.S. Appl. No. 11/610,499", (Dec. 13, 2006).
Rosenberg, "U.S. Appl. No. 11/315,755", (Dec. 21, 2005).
Rosenberg, "U.S. Appl. No. 11/344,612", (Nov. 16, 2006).
Rosenberg, "U.S. Appl. No. 11/344,701", (Jan. 31, 2006 ).
Rosenberg, "U.S. Appl. No. 11/425,990", (Jun. 22, 2006).
Spohrer, "Information in Places", *IBM Systems Journal; 1999*; pp. 602-628; vol. 38, No. 4.
Rosenberg, "U.S. Appl. No. 11/619,607", (Jan. 3, 2007).
Rosenberg, "U.S. Appl. No. 11/341,948", (Jan. 27, 2006).
Rosenberg, "U.S. Appl. No. 11/683,394", (Mar. 7, 2007).
Rosenberg, "U.S. Appl. No. 11/344,613", (Jan. 31, 2006).
Rosenberg, "U.S. Appl. No. 11/682,874", (Mar. 6, 2007).
Rosenberg, "U.S. Appl. No. 11/278,531", (Apr. 3, 2006).
Rosenberg, "U.S. Appl. No. 11/697,704", (Apr. 6, 2007).
Sharper Image, "Laser Baseball", *Item # PS115*; downloaded from www.sharperimage.com on Dec. 9, 2005, 18 pages.
Rudy, Richard "U.S. Appl. No. 11/223,386", (Mar. 22, 2007).
Rosenberg, "U.S. Appl. No. 11/610,615", (May 10, 2007).
Rosenberg, "U.S. Appl. No. 11/677,045", (Feb. 20, 2007).
Rosenberg, " U.S. Appl. No. 11/539,598", (Oct. 6, 2006).
Notice of Allowance for U.S. Appl. No. 11/285,534 mailed Nov. 19, 2008.
Examiner Interview for U.S. Appl. No. 11/285,534 mailed Nov. 19, 2008.
Office Action from U.S. Appl. No. 11/315,762 mailed Aug. 12, 2008.
Non-final Office Action from U.S. Appl. No. 11/539,598 mailed Sep. 19, 2008.
Non-final Office Action from U.S. Appl. No. 11/427,325 mailed Sep. 24, 2008.
Non-final Office Action from U.S. Appl. No. 11/341,025 mailed Sep. 24, 2008.
Non-final Office Action for U.S. Appl. No. 11/315,755 mailed Sep. 30, 2008.
Final Office Action from U.S. Appl. No. 11/383,195 mailed Oct. 15, 2008.
Non Final Office Action from U.S. Appl. No. 11/775,314 mailed Oct. 29, 2008.
U.S. Appl. No. 11/285,534, filed Nov. 22, 2005, Rosenberg.
U.S. Appl. No. 11/539,598, filed Oct. 6, 2006, Rosenberg.
Office Action from U.S. Appl. No. 11/315,762 dated Jan. 29, 2008.*
Office Action from U.S. Appl. No. 11/344,701 dated Jan. 24, 2008.*
Office Action from U.S. Appl. No. 11/422,065 dated Jan. 28, 2008.*
Office Action from U.S. Appl. No. 11/383,195 dated Mar. 19, 2008.*
Office Action from U.S. Appl. No. 11/344,612 dated Apr. 8, 2008.*
Anonymous, et al., "Social Search", Wikipedia.com Jan. 23, 2008.*
Finkelstein, Lev et al., "Placing Search in Context: The Concept Revisited", Zapper Technologies May 5, 2001.*
Sullivan, Danny et al., "Eurekster Launches Personalized Social Search", SearchEngineWatch.com Online Newsletter Jan. 24, 2004.*
Office Action from U.S. Appl. No. 11/282,379 mailed May 30, 2008.*
Office Action from U.S. Appl. No. 11/298,797 mailed Jun. 25, 2008.*
Office Action from U.S. Appl. No. 11/618,858 mailed Jul. 9, 2008.*
Office Action from U.S. Appl. No. 11/285,534 mailed Jul. 21, 2008.*
Office Action from U.S. Appl. No. 11/267,079 mailed Jul. 17, 2008.*
Office Action from U.S. Appl. No. 11/427,320 mailed Jul. 23, 2008.*
Office Action from U.S. Appl. No. 11/341,021 mailed Aug. 14, 2008.*

* cited by examiner

METHOD AND APPARATUS FOR A VERBO-MANUAL GESTURE INTERFACE

This application claims the benefit of U.S. Provisional Application No. 60/701,101, filed Jul. 19, 2005, which is incorporated in its entirety herein by reference.

BACKGROUND OF THE INVENTION

1. Field of the Invention

The present invention relates to user interface methods and apparatus that enable one or more electronic devices to be responsive to user who utters a verbal command while simultaneously manipulating a physical interface in a time-synchronized manner. More specifically, the present invention relates to methods and apparatus that enable a user to convey commands to one or more electric devices, the form and/or function of the commands being dependent upon (a) the sensed characteristics of how the user physically manipulates the physical interface, (b) the sensed characteristics of the verbal utterances spoken by the user, and (c) the time synchronization between the physical manipulations and the verbal utterances.

2. Discussion of the Related Art

Traditional gamepads, joysticks, and mice allow a user to command input to video games, personal computers, and other electrical devices through manual manipulations, but typically do not provide a means for inputting commands based upon specific spatially enacted manual gestures, such as waving a wand in a particular gestural manner, and do not recognize commands based upon the manual gestures being time-correlated to spoken utterances, such as verbalizing a specific command-related incantation. Other systems have been developed that allow users to wave a wand-shaped interface as a means of sending a command to an electrical system. See, for example, U.S. Patent Application 20030069077 A1 to Korienek, which is hereby incorporated by reference. However, such systems do not provide a means for inputting commands based upon a spatially enacted manual gesture, such as waving a wand, time-correlated to a spoken utterance, such as verbalizing a specific command-related incantation. Furthermore the system disclosed in Korienek does not appear to disclose methods for detecting, processing, and recognizing each of a plurality of distinct manual gestures imparted by the user and responding accordingly with differing control of one or more electronic devices for each of the distinct manual gestures. U.S. Patent Application 20040166937 to Rothschild et al., which is hereby incorporated by reference, allows a user to provide input to a computer gaming system through detected manual gestures or through spoken commands, but does not appear disclose user interface methods responsive to spatially enacted manual gestures that are time-correlated with a spoken utterance as is disclosed herein.

SUMMARY OF THE INVENTION

Several embodiments of the invention advantageously address the needs above as well as other needs by providing, for example, an interface system including a manipulandum adapted to be moveable according to a manual gesture imparted by the user; a sensor adapted to detect a characteristic of the manual gesture imparted to the manipulandum and to generate a sensor signal representing the detected characteristic of the manual gesture; a microphone adapted to detect a characteristic of an utterance spoken by the user and to generate an audio signal representing the detected characteristic of the spoken utterance; and a control system adapted receive the generated sensor and audio signals and to transmit a command signal to an electronic device via a communication link, the command signal being based on the generated sensor and audio signals.

In one embodiment, the invention can be characterized as an interface method including a step of detecting a characteristic of a manual gesture imparted by a user to a manipulandum; a step of detecting a characteristic of an utterance spoken by the user; and a step of controlling an electronic device based on the detected characteristics of the manual gesture and spoken utterance.

In another embodiment, the invention can be characterized as a method of controlling an electronic device that includes storing a plurality of definitions, each definition comprising temporally proximate pairing of a reference gesture signal pattern and a reference audio signal pattern; assigning a control command to each definition, the control command being adapted to generate a response by an electronic device; determining whether received signals representing a detected characteristic of a manual gesture imparted to a manipulandum and a detected characteristic of a spoken utterance have a predetermined relationship with a stored definition; and transmitting a control command to an electronic device, the transmitted control command being assigned to a definition determined to have a predetermined relationship with the received signals.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
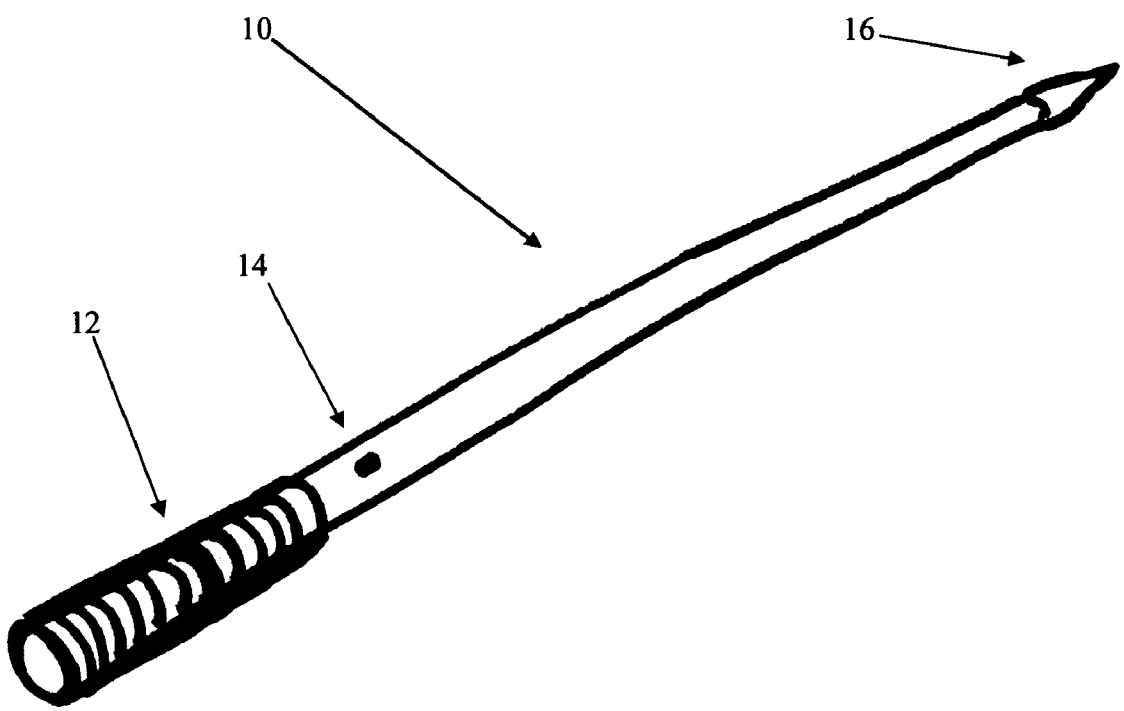
FIG. 1 illustrates a wand-shaped manipulandum in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

The methods and apparatus disclosed herein relate to a sensor-equipped physical interface (i.e., manipulandum) that is held in hand of a user and moved by the user with specific gestural motions to select and/or issue commands to one or more electronic devices. The gestural motions are synchronized in time with verbal utterances provided by the user to create what is referred to herein as "verbo-manual" gestures. According to many embodiments of the present invention, methods and apparatus are provided for storing, detecting, processing, identifying, and responding to verbo-manual gestures.

In one embodiment, the manipulandum is fitted with one or more sensors (e.g., position sensors, motion sensors, orientation sensors, and the like) adapted to detect manual gestures imparted by the user upon the manipulandum. Once detected, the imparted manual gestures can be recognized from among a plurality of recognizable manual gestures (e.g., reference manual gestures) and/or can be time-characterized. For example, the manual gestures imparted by the user can be sensed by a motion sensor such as an accelerometer, the accelerometer generates acceleration data (e.g., in the form of a signal having a profile that can be recognized from a plurality of recognizable profiles representing reference manual gestures. The acceleration signal is captured as a time-varying profile that is stored and processed by a control system to determine the time-varying characteristics of user induced motions of the manipulandum. The time-varying characteristics may include the direction of user induced motions, the intensity of user induced motions, and the timing of user induced motions upon the manipulandum. In embodiments where the manipulandum is equipped with motion sensors, other components such as signal conditioning electronics, power electronics, batteries, and/or manual switches, are likely also included within or upon the manipulandum.

As mentioned above, the control system analyzes sensor data and responds accordingly. The control system includes one or more processors. The control system may be housed within the manipulandum or may be housed in a separate physical location such that signals transmitted from the manipulandum are transmitted to the control system over a wired or wireless communication link.

In one embodiment, one or more microphones are provided for capturing verbal utterances produced by the user in time-synchronization with the manually induced physical motions imparted upon the manipulandum as described above. The one or more microphones may be mounted within the manipulandum or may be mounted within and/or connected to one or more electronic devices with which the manipulandum interfaces. For example, in embodiments where the manipulandum is provided as a wand-shaped device fitted with motion sensors as described above, the wand-shaped device may also be fitted with one or more microphones and/or audio signal conditioning electronics such that the user can produce verbal utterances while manipulating the manipulandum and the verbal utterances can be captured by the one or more microphones as a time-varying audio signal. The time-varying audio signal is stored and processed by the control system to determine the time-varying characteristics of verbal utterances spoken by the user. In many embodiments, the control system runs speech recognition routines to recognize specific words, phrases, and/or phonemes, uttered by the user. In other embodiments, the control system also performs a time-analysis of the utterances wherein the timing of the utterances are recognized and compared to the time-varying characteristics of the user induced motions upon the physical manipulandum. In this way, the content and timing of the user's verbal utterances are captured and recognized along with the content and timing of the user's manual gestures to determine if one of a plurality of specific verbo-manual gestures has been produced by the user. If one of a plurality of specific verbal-manual gestures has been produced by the user, as determined by an analysis performed by the control system of the degree of synchronization between specific verbal utterances and specific manual gestures imparted upon the manipulandum, then the control system of the present invention imparts a specific command to one or more electronic devices. In this way a user can issue one of a plurality of verbo-manual gestures as a means of imparting one of a plurality of commands upon one or more electronic devices.

As disclosed herein, a wide variety of verbo-manual gestures may be enabled by recognizing a variety of manual gestures that are time-synchronized in specific ways with a variety of verbal utterances. Furthermore, the wide variety of specific verbo-manual gestures may be mapped in the software of the control system to a variety of specific commands issued to the one or more electronic devices. For example, the system may be configured to recognize twenty distinct verbo-manual gestures, each of the gestures being recognized as a specific combination of verbal utterance and manual gesture with a specific time-synchronization between one or more components of the verbal utterance and one or more components of the manual gesture. In many embodiments, the one or more components of the verbal utterances are syllables of words uttered by the user. In many embodiments, the one or more components of the manual gestures are manual swings of the manipulandum that cause spikes in acceleration data collected by on board accelerometers (or spikes in other motion data collected by other on board motion sensing devices). In many embodiments of the present invention, the time-synchronization between one or more components of the verbal utterance and one or more components of the manual gesture is determined as a time-synchronization between the utterance of one or more specific syllables of specific words uttered by the user with one or more manual swings of the manipulandum that-cause spikes in the motion data collected by on board sensors. By "time-synchronization" it is meant herein that two events, such as a specific uttered syllable as determined by the audio processing hardware and methods disclosed herein and a specific manual gesture such as a manual swing of the manipulandum of a particular magnitude (or above a particular magnitude) are within a predetermining temporal proximity with each other (e.g., substantially simultaneous within the perceptual limits of a human user). As used herein, the term "substantially simultaneous" means that the two events happen in time within 200 milliseconds of each other. Thus the present invention discloses a system in which a user utters verbal commands while wielding a manipulandum, the verbal commands are captured and processed by a microphone and supporting speech processing hardware and software, the manual gestures imparted by wielding the manipulandum are captured and processed by one or more motion sensors and supporting sensor processing hardware and software, and the time-characteristics of specific verbal utterances (such as specifically identified syllables of specifically identified words) are compared to the time characteristics of specific manually induced motions (such as swings of the manipulandum of a particular magnitude, of more than a particular magnitude, and/or of a particular direction) to determine how specific verbal utterances are correctly time-synchronized with specific manually induced motions. Based upon (a) the specific verbal utterances produced by the user, (b) the specific manually induced motions produced by the user, and (c) the specific time synchronizations between the specific verbal utterances and the specific manually induced motions, a particular verbo-manual gesture is determined to have been issued by the control system and a correlating command is send to one or more electronic devices. For purposes of discussion, data collected by the present invention that represents the specific verbal utterances produced by the user as collected by microphones, the specific gestures imparted to a manipulandum by a user as collected by sensors (e.g., as manually induced motions produced by the user), and the representation of the time synchronizations between the specific-verbal utterances and the specific manually induced motions, are referred to herein as "Input Data."

To enable the processing and identification of specific verbo-manual gestures from a plurality of enabled verbo-manual gestures, a plurality of different verbo-manual gesture definitions are stored in memory accessible to the control system as data that defines each of the plurality of different verbo-manual gestures and associates each of the different verbo-manual gestures with particular commands to be performed by one or more electronic devices. The data that comprises a definition of each unique verbo-manual gesture includes data that. defines reference verbal utterances that. comprise the particular verbo-manual gesture, data that defines the reference manual gestures that comprise the particular verbo-manual gesture, and data that defines the time-synchronization between one or more portions of the verbal utterances and one or more portions of the manual gestures. The data also includes data that relates the particular verbo-manual gesture with one or more particular commands to be performed by one or more electronic devices when the gesture is successfully performed by a user. The data that defines a plurality of different verbo-manual gesture definitions is referred to herein as Verbo-Manual Gesture Definition Data and is generally stored in memory accessible the control system routines that process Input Data from the user and determines if the input data indicates that the user has successfully delivered one of the plurality of different verbo-manual gestures and if so, which one.

The data that defines the verbal utterance that must be spoken to successfully perform a particular verbo-manual gesture may include the specific words, phrases, or phonemes that must be uttered as part of that particular verbo-manual gesture. The data that defines the verbal utterance that must be spoken to successfully perform a particular verbo-manual gesture may also include specific timing data that indicates the rhythm, speed, or other time-varying characteristics that must be vocally achieved by the user when the user delivers the utterance. The data that defines the verbal utterance that must be spoken to successfully perform a particular verbo-manual gesture may also include volume characteristics, accenting characteristics, and speed characteristics that must be achieved by the user when the user verbally delivers the utterance. In this way, the data that defines the verbal utterance can specify in detail not just the spoken words that must be delivered by the user, but also how those words must be delivered in rhythm, timing, accenting, speed and/or other time-vary characteristic. In many embodiments, delivery characteristics of verbal utterances can be defined as a reference pattern of thresholds that must be exceeded, thresholds that must not be exceeded, and/or ranges that must be met. For example, a speed delivery characteristic may be defined as a minimum speed threshold that must be exceeded, a maximum speed threshold that must not be exceeded, or a speed range that must be met by the user when the user delivers a particular verbal utterance.

The data that defines the manual gesture that must be enacted by the user by wielding the manipulandum in order to successfully perform a particular verbo-manual gesture may include specific acceleration levels and/or specific acceleration directions that must be imparted by a user at specific times and/or in specific orders. The data that defines the manual gesture that must be enacted by the user by wielding the manipulandum in order to successfully perform a particular verbo-manual gesture may also include specific timing data that indicates the rhythm, speed, or other time-varying characteristics that must be achieved by the user when the user imparts particularly required motions upon the manipulandum. The data that defines the manual gesture that must be enacted by the user by wielding the manipulandum in order to successfully perform a particular verbo-manual gesture may include may also include absolute or relative gesture magnitude characteristics and/or speed characteristics that must be achieved by the user when the user delivers the gesture. In many embodiments, delivery characteristics of manual gestures can be defined as a reference pattern of thresholds that must be exceeded, thresholds that must not be exceeded, and/or ranges that must be met. For example, an acceleration level delivery characteristic may be defined as a minimum acceleration threshold that must be exceeded, a maximum acceleration threshold that must not be exceeded, or an acceleration range that must be met by the user when the user delivers a particular manual gesture.

The data that defines and/or represents the required time-synchronization between one or more portions of the verbal utterances and one or more portions of the manual gestures that must be performed by the user to successfully deliver the verbo-manual gesture, may include data that defines particular physical motions that must be time-synchronized with particular verbally spoken phonemes, syllables, or words. In many embodiments, required synchronization characteristics between verbal utterances and manual gestures are defined as thresholds that must be exceeded, thresholds that must not be exceeded, and/or ranges that must be met. For example, the synchronization between a particular verbal utterance and a particular manual gesture may defined by the synchronicity threshold of their onset-times such that a particular portion of the manual gesture and a particular portion of the verbal utterance must have onset times that come within a certain time-threshold of each other. Such a time threshold could be, for example, less than 200 milliseconds.

If a user's specific verbal utterances, specific manually induced motions, and/or the specific time synchronizations between the verbal utterances and the manually induced motions is/are determined to be outside an acceptable range, the control system will not recognize the verbo-manual gesture as the one intended by the user. In this way, the present invention can be configured to make it somewhat challenging for a user to issue a specifically intended verbo-manual gesture from a plurality of verbo-manual gestures. This may be useful for applications of the present invention that are entertainment and/or gaming applications in which part of the entertainment experience is requiring the user to learn how to issue a plurality of challenging verbo-manual gestures. For example, in one embodiment of the present invention the user interface manipulandum represents a "magic wand" that is used by the user by enacting specific manual gestures with the wand while uttering specific verbal phrases, the specific manual gestures and the specific verbal utterances being performed by the user with a specific time-synchronization relating them. In this way the "magic wand" device disclosed herein is a user interface responsive to user issued magical incantations, the incantations including a verbal component that is uttered, a physical component that is imparted upon the magic wand manipulandum, and a synchronization component that is dependent upon the time-based relationship between portions of the physical manipulations and portions of the verbal utterances. Thus in such particular embodiments, the verbo-manual gestures are referred to as incantations, the incantations being defined as having required verbal components, required manual gesture components, and required synchronizations characteristics between one or more verbal components and one or more manual gesture components.

A plurality of different incantations can be enabled in this way by storing in memory accessible to the control system, data that defines each of the plurality of different incantations and associates the incantations with particular commands to be performed by one or more electronic devices. The data that comprises a definition of each unique incantation includes data that defines the verbal utterances that comprise the particular incantation, data that defines the manual gestures that comprise the particular incantation, and data that defines the time-synchronization between one or more portions of the verbal utterances and one or more portions of the manual gestures. The data also includes data that relates the particular incantation with one or more particular commands to be performed by one or more electronic devices.

The data that defines the verbal utterance that must be spoken to successfully perform a particular incantation may include the specific words, phrases, or phonemes that must be uttered. The data that defines the verbal utterance that must be spoken to successfully perform a particular incantation may also include specific timing data that indicates the rhythm, speed, or other time-varying characteristics that must be achieved by the user when the user delivers the utterance. The data that defines the verbal utterance that must be spoken to successfully perform a particular incantation may also include volume characteristics, accenting characteristics, and speed characteristics that must be achieved by the user when the user delivers the utterance.

The data that defines the manual gesture that must be enacted by the user by wielding the manipulandum in order to successfully perform a particular incantation may include specific acceleration levels and/or specific acceleration directions that must be imparted by a user at specific times and/or in specific orders. The data that defines the manual gesture that must be enacted by the user by wielding the manipulandum in order to successfully perform a particular incantation may also include specific fining data that indicates the rhythm, speed, or other time-varying characteristics that must be achieved by the user when the user imparts motions upon the manipulandum. The data that defines the manual gesture that must be enacted by the user by wielding the manipulandum in order to successfully perform a particular incantation may include may also include absolute or relative gesture magnitude characteristics and/or speed characteristics that must be achieved by the user when the user delivers the gesture.

The data that defines and/or represents the required time-synchronization between one or more portions of the verbal utterances and one or more portions of the manual gestures that must be performed by the user to successfully deliver the incantation may include data that defines particular physical motions that must be time-synchronized with particular verbally spoken phonemes, syllables, or words.

As an example of data that defines each of the plurality of different incantations and associates the incantations with particular commands to be performed by one or more electronic devices, consider the following: a gaming embodiment of the present invention provides the user with a magic wand that includes an accelerometer that detects user imparted strokes of the wand. The gaming embodiment of the present invention includes a microphone for capturing user verbal utterances, the microphone providing data that is processed by speech recognition routines and speech timing analysis routines. The gaming embodiment is a user interface method and apparatus that allows a user to issue commands to one or more computers running a gaming application, the commands being dependent upon the particular verbo-manual gestures issued by the user, the verbo-manual gestures being magical incantations that are required of the user to perform particular actions within the gaming application. For example, the gaming application allows the user to play the role of a wizard and by using the present invention, the user can issue particular commands to the software by performing specific incantations that have specific verbal, manual, and time-synchronization requirements. Verbo-Manual Gesture Definition Data representing a plurality of the specific incantations is stored in memory accessible the control system of the present invention. In this particular embodiment, the control system is enabled in part upon the gaming computer that is running the gaming application. Software within the computer is configured to collect and process Input Data from the inventive interface, the Input Data including verbal utterance data and manual gesture data to determine if a particular incantation of the plurality of specific incantations has been successfully delivered by the user. Verbo-Manual Gesture Definition Data representing the plurality of specific incantations that are recognized by the gaming application is accessed and compared to Input Data from the user to determine if the user successfully delivered an incantation and if so, which incantation of the plurality was delivered.

For example, the Verbo Manual Gesture Definition Data in the current gaming example is stored in memory that is accessible to the control system and represents 12 different magical incantations, each of the incantations including a specific verbal utterance, a specific manual gesture, and one or more required synchronizations between a portion of the verbal utterance and a portion of the manual gestures. More specifically, one of the 12 different magical incantations defined within the Verbo-Manual Gesture Definition Data is an Open-Sesame magical incantation that will send an open command to one or more electric devices. The open command, in one embodiment, causes a simulated door to open within a simulated entertainment application that is displayed to the user by one or more electronic devices. The open command, in another embodiment, causes a simulated treasure chest to open within a simulated video game application that is displayed to the user by one or more electronic devices. The open command, in another embodiment, causes a real door to open in a real room, the opening of the real door being electronically controlled by one or more electronic devices. The open command, in another embodiment, causes the trunk of a real car to open, the opening of the real car door being electronically controlled by one or more electronic devices, the one or more electronic devices including for example control electronics within the real car. The open command, in another embodiment, causes a computer file to open in a computer operating system, the opening of the computer file being electronically controlled by one or more electronic device, the one or more electronic devices including for example the computer that is running the computer operating system.

The Open Sesame incantation is a verbo-manual gesture defined within the Verbo-Manual Gesture Definition Data as a specific verbal utterance, a specific manual gesture, and one or more required synchronizations between a portion of the verbal utterance and a portion of the manual gestures. More specifically, the Open Sesame incantation is defined as verbal utterance of the phrase "Open Sesame" by a user synchronized in time with the user imparting three up-down strokes upon the sensed manipulandum such that the first up-down stroke is substantially simultaneous in time with the verbal utterance of the first syllable of the word "Open" and the second up-down stroke is substantially simultaneous in time with the verbal utterance of the first syllable of the word "Sesame" and the third up-down stroke is substantially simultaneous with the verbal utterance of the third syllable of the word "Sesame." By substantially simultaneous it is meant that the utterance and the physical motion happen close enough in time such that the delay between them is not substantially noticeable to a human user. For example, a verbal utterance and a physical motion that are separated in time by less than a 200 millisecond delay may be considered substantially simultaneous within the context of this invention. Thus as defined within the Verbo-Manual Gesture Definition Data, the Open Sesame command is a verbal utterance of the phrase "Open Sesame" that is synchronized in time with three up-down strokes of the manipulandum, the first stroke being imparted by the user as he says the first syllable of the word "open," the second stroke being imparted by the user as he says the first syllable of the word "Sesame," and the third stroke being imparted by the user as he says the third syllable of the word "Sesame," such that the synchronized stroke and utterances must occur within 200 ms of each other.

As defined herein, a number of different and distinctly identifiable strokes may be imparted by the user upon the manipulandum, the different and distinctly identifiable strokes being sensed by one or more sensors within or upon the manipulandum and identified by the control system that processes the sensor data. The processing of sensor data includes analyzing the profile of a time-vary sensor signal from the sensors and determining if it matches a characteristic form. By characteristic form it is meant that the signal data follows an identifiable profile or pattern within bounding limits. The types of strokes that are identifiable are dependent upon the type of sensors used. In many embodiments of the present invention, accelerometer sensors are used as the prime sensing element for the identification of manual strokes imparted upon the manipulandum and so the identification of strokes will be described with respect to accelerometer sensors herein. That does not limit the fact that other embodiments of verbo-manual gesture interface manipulandum devices can created with different or additional sensors such as gyroscopes, magnetometers, optical cameras, ultrasonic transducers, and other position and/or motion sensing sensors.

With respect to accelerometer sensors, a plurality of different embodiments can be enabled within the context of the present invention. In the simplest embodiment, a single accelerometer is used that detects accelerations along a single sensing axis. In more complex embodiments, multiple single-axis accelerometers and/or a single multi-axis accelerometer is used such that acceleration data can be collected that detects accelerations imparted by the user upon the manipulandum along multiple axis of motion. For example, some embodiments of the present invention employs two axes of acceleration sensing, the two axes being along for example an X-AXIS and a Y-AXIS. Other embodiments of the present invention employ three axes of acceleration sensing, the three axes being along for example an X-AXIS and Y-AXIS and a Z-AXIS. Other embodiments of the present invention employs six-degree-of-freedom acceleration sensing, including X, Y, Z linear accelerations and ROLL, PITCH, YAW, rotary accelerations.

With respect to embodiments of the present invention that use accelerometers mounted within or upon the manipulandum, it will be appreciated that accelerometers will not give absolute directional information with respect the user's environment but rather will give directional information relative to the manipulandum based upon how the sensors are mounted upon the manipulandum. For this reason, many embodiments of the present invention provide a manipulandum with a particular orientation such that the user holds the manipulandum in an expected orientation when imparting gestures. By holding the manipulandum in an expected orientation, the accelerometers are in an expected configuration with respect to the user's environment. In some embodiments, additional sensors are used to relate accelerometer orientation with the user's environment, the additional sensors being for example magnetometers, gyroscopic sensors, GPS sensors, and/or other sensors that can provide additional reference frame information. Regardless, most embodiments still require that the user hold the manipulandum in an expected orientation. To facilitate this, the manipulandum is provided with external features that allow a user to easily identify the correct orientation for holding. For example, some embodiments have an identifying feature such as a handle portion and an end potion, such that the user knows which side to hold. Many embodiments are wand- shaped embodiments, the wand-shaped embodiment having a handle end and a tip end. To further facilitate holding the manipulandum in an expected orientation, a visually identifiable feature is included that indicates which end of the manipulandum should face upward when the user is holding it straight out before him. When held in this way, the direction "up" is therefore defined as up away from the ground that the user is standing upon, "down" is defined as down towards the ground, "left" is defined as to the users left, "right" is defined as to the user's right, "forward" is defined as away from the user in the direction he or she is facing when looking straight head, and "back" is defined as towards the user as if something was approaching the user from the direction the user is facing when looking straight ahead.

With respect to the number of different and distinctly identifiable strokes may be imparted by the user upon the manipulandum, this depends upon the sensor configuration deployed. For example, a manipulandum with a single axis of acceleration sensing can be used in a system that identifies a certain number of distinctly identifiable strokes imparted by the user. A manipulandum with more axes of acceleration sensing can generally be used in a system that identifies additional distinctly identifiable strokes imparted by the user. While it is impossible to explain in detail the identification techniques for all the possible distinctly identifiable strokes that may be imparted by a user, sensed by sensors, and identified by software running upon the control system, a number of different strokes will be provided here as an example of the basic methods invented and used herein.

One of the most basic unique identifiable strokes is the up-stroke, the upstroke being an upward motion imparted by the user upon the manipulandum such that it is drawn upward in a smooth quick motion away from the floor. Because of the kinematics of the human arm, the motion of the will actually follow an upward arc, not a straight upward motion. For example, for embodiments when the manipulandum is a wand, the user performs an up-stroke by raising the wand upward in a smooth quick motion. For embodiments that use accelerometers as the motion sensor on board the manipulandum, the up-stroke is identified by a characteristic pattern comprising an upward acceleration spike followed by a downward acceleration spike. This pattern is the result of the user first accelerating the manipulandum upward and then slowing the manipulandum back to rest by imparting downward acceleration, the upward acceleration spikes and downward acceleration spikes registering above defined upward and/or downward threshold levels respectively. In some embodiments of the present invention the up-stroke is not just identified by its characteristic form, but also quantified as having a magnitude that is equal to, proportional to, or otherwise computed based upon the size of the upward and/or downward spikes. In many embodiments is magnitude of the up-stroke is computed based upon the size (i.e. amplitude) of the upward acceleration spike.

Another basic unique identifiable stroke is the downstroke, the down-stroke being a downward motion imparted by the user upon the manipulandum such that it is drawn downward in a smooth quick motion towards the floor. Because of the kinematics of the human arm, the motion of the will actually follow a downward arc, not a straight down motion. For example, for embodiments when the manipulandum is a wand, the user performs a down-stroke by lowering in a smooth quick motion. For embodiments that use accelerometers as the motion sensor on board the manipulandum, the down-stroke is identified by a characteristic pattern comprising a downward acceleration spike followed by an upward acceleration spike. This pattern is the result of the user first accelerating the manipulandum downward and then slowing the manipulandum back to rest by imparting upward acceleration, the downward acceleration spikes and upward acceleration spikes registering, above defined downward and/or. upward threshold levels respectively. In some embodiments of the present invention the down-stroke is not just identified by its characteristic form, but also quantified as having a magnitude that is equal to, proportional to, or otherwise computed based upon the size of the downward and/or upward spikes. In many embodiments is magnitude of the downstroke is computed based upon the size (i.e. amplitude) of the downward acceleration spike.

As mentioned above, one unique identifiable stroke is an up-down stroke, the up-down stroke being a motion imparted by the user upon the manipulandum such that is waved by the user in an up-down motion, first moving upward and then moving downward. For embodiments that use accelerometers as the motion sensor on board the manipulandum, the up-down stroke is identified by a characteristic pattern comprising an upward acceleration spike followed by a downward acceleration plateau, followed by another upward acceleration spike, the upward acceleration spikes and downward acceleration plateaus registering above defined upward and/or downward threshold levels respectively. In some embodiments of the present invention the up-down stroke is not just identified by it's characteristic form, but also quantified as having a magnitude that is equal to, proportional to, or otherwise computed based upon the size (i.e. amplitude) of the upward spikes and/or downward plateaus that were recorded by sensors.

Another unique identifiable stroke is a down-up stroke, the down-up stroke being a motion imparted by the user upon the. manipulandum such that is waved by the user in an down-up motion, first moving downward and then moving upward. For embodiments that use accelerometers as the motion sensor on board the manipulandum, the down-up stroke is identified by a characteristic pattern comprising a downward acceleration spike followed by an upward acceleration plateau, followed by another downward acceleration spike, the downward acceleration spikes and upward acceleration plateaus registering above defined downward and/or upward threshold levels respectively. In some embodiments of the present invention the down-up stroke is not just identified by it's characteristic form, but also quantified as having a magnitude that is equal to, proportional to, or otherwise computed based upon the size (i.e. amplitude) of the downward spikes and/or upward plateaus that were recorded by sensors.

The above four strokes (i.e. up-stroke, down-stroke, up-down stroke, and down-up stroke) are generally used in embodiments of the present invention that have an accelerometer sensor mounted within or upon the manipulandum such that it is orientated to detect up and down accelerations when the manipulandum straight out from the user pointing forward with the identification mark pointing up as described previously. This will be referred to herein as the Y-AXIS. For embodiments of the present invention that also include another axis of acceleration sensing oriented to detect side-to-side accelerations when the manipulandum is held straight out from the user pointing forward with the identification mark pointing up as described previously, additional strokes can be identified in a very similar and analogous manner to the four previously mentioned by using the data from this additional sensor. This additional direction of sensing will be referred to herein as the X-AXIS. Thus using sensing, processing, and identification methods that are directly analogous to those described above for the Y-AXIS sensor and the four strokes (up-stroke, down-stroke, up-down stroke, and down-up stroke), sensing, processing, and identification methods can be used for data from the X-AXIS sensor that detect four strokes referred to herein as left-stroke, right-stroke, left-right stroke, and right-left stroke. These are described very briefly below because the identification methods are so similar to those used for up-stroke, down-stroke, up-down stroke, and down-up stroke respectively:

Using the X-AXIS sensor data as mentioned above, a uniquely identifiable stroke is the left-stroke, the left-stroke being a leftward motion imparted by the user upon the manipulandum such that it is drawn left in a smooth quick motion. Because of the kinematics of the human-arm, the motion of the will actually follow a leftward arc. The left-stroke is identified by a characteristic pattern comprising a leftward acceleration spike followed by a rightward acceleration spike. This pattern is the result of the user first accelerating the manipulandum leftward and then slowing the manipulandum back to rest by imparting rightward acceleration, the leftward acceleration spikes and/or rightward acceleration spikes registering above defined levels. In some embodiments of the present invention the left-stroke is not just identified by its characteristic form, but also quantified as having a magnitude that is equal to, proportional to, or otherwise computed based upon the amplitude of the leftward and/or rightward spikes.

Also using the X-AXIS sensor data, another uniquely identifiable strokes is the right-stroke, the right-stroke being a rightward motion imparted by the user upon the manipulandum such that it is drawn right in a smooth quick motion. Because of the kinematics of the human arm, the motion of the will actually follow a rightward arc. The right-stroke is identified by a characteristic pattern comprising a rightward acceleration spike followed by a leftward acceleration spike. This pattern is the result of the user first accelerating the manipulandum rightward and then slowing the manipulandum back to rest by imparting leftward acceleration, the rightward acceleration spikes and/or leftward acceleration spikes registering above defined threshold levels. In some embodiments of the present invention the right-stroke is not just identified by its characteristic form, but also quantified as having a magnitude that is equal to, proportional to, or otherwise computed based upon the amplitude of the leftward and/or rightward spikes.

As mentioned above, one unique identifiable stroke is a left-right stroke, the left-right stroke being a motion imparted by the user upon the manipulandum such that is waved by the user in a left-right motion, first moving leftward and then moving rightward. The left-right stroke is identified by a characteristic pattern comprising a leftward acceleration spike followed by a rightward acceleration plateau, followed by another leftward acceleration spike, the acceleration spikes and/or plateaus registering above defined threshold levels. In some embodiments of the present invention the left-right stroke is not just identified by it's characteristic form, but also quantified as having a magnitude that is equal to, proportional to, or otherwise computed based upon the amplitude of the spikes and/or plateaus recorded by sensors.

As mentioned above, one unique identifiable stroke is an right-left stroke, the right-left stroke being a motion imparted by the user upon the manipulandum such that is waved by the user in a right-left motion, first moving rightward and then moving leftward. The right-left stroke is identified by a characteristic pattern comprising a rightward acceleration spike followed by a leftward acceleration plateau, followed by another rightward acceleration spike, the acceleration spikes and/or plateaus registering above defined threshold levels. In some embodiments of the present invention the right-left stroke is not just identified by it's characteristic form, but also quantified as having a magnitude that is equal to, proportional to, or otherwise computed based upon the amplitude of the spikes and/or plateaus recorded by sensors.

Using data from the X-AXIS sensor and Y-AXIS sensor in combination, additional identifiable strokes can be defined and identified by software running on the control system processor. One such stroke that can be identified by characteristic sensor data profiles is a circle-clockwise stroke in which the tip end of the manipulandum is circled in a clockwise direction by the user. Similarly, another stroke that can be identified by characteristic sensor data from the two axis sensors is a circle-counterclockwise stroke in which the tip end of the manipulandum is circled in a counterclockwise direction by the user.

For embodiments of the present invention that include another axis of acceleration sensing oriented to detect forward-back accelerations when the manipulandum is held straight out from the user pointing forward with the identification mark pointing up as described previously, additional strokes can be identified in a very similar and analogous manner to the four previously mentioned. This additional direction of sensing will be referred to herein as the Z-AXIS.

For example, using data from the Z-AXIS one such stroke that can be identified by characteristic sensor data profiles is a forward-thrust stroke, the forward-thrust stroke being a forward motion imparted by the user upon the manipulandum such that it is thrusted forward in a quick motion. The forward-thrust stroke is identified by a characteristic pattern comprising a forward acceleration spike followed by a backward acceleration spike. This pattern is the result of the user first accelerating the manipulandum forward and then slowing the manipulandum back to rest by imparting backward acceleration, the forward acceleration spike registering above a defined threshold level. In some embodiments of the present invention the forward-thrust stroke is not just identified by its characteristic form, but also quantified as having a magnitude that is equal to, proportional to, or otherwise computed based upon the amplitude of the forward spike.

Another stroke that can be identified from the Z-AXIS sensor data based upon the characteristic profiles of the data is a backward-pull stroke, the backward-pull stroke being a backward motion imparted by the user upon the manipulandum such that it is drawn back (towards the user) in a quick motion. The backward-pull stroke is identified by a characteristic pattern comprising a backward acceleration spike followed by a forward acceleration spike. This pattern is the result of the user first accelerating the manipulandum backward and then slowing the manipulandum back to rest by imparting forward acceleration, the backward acceleration spike registering above a defined threshold level. In some embodiments of the present invention the backward-pull stroke is not just identified by its characteristic form, but also quantified as having a magnitude that is equal to, proportional to, or otherwise computed based upon the amplitude of the backward spike.

Verbo-Manual Gestures: As described previously with respect to the Open Sesame example, a specific verbo-manual gesture may be defined by data stored in memory, the data describing (a) a specific verbal utterance, (b) a specific manual gesture, and (c) one or more required synchronizations between a portion of the verbal utterance and a portion of the manual gestures. A wide variety of unique verbo-manual gestures may therefore be defined in memory as a combination of one or more physical strokes of a manipulandum (such as the characteristic and identifiable strokes described above) and one or more verbally spoken words (that may be identified by speech processing routines known to the art), such that the combinations have a specific synchronizations between portions of the verbal utterance and one or more manipulation strokes. For example, a verbo-manual gesture used in a magic-wand based entertainment application may be defined as (a) the verbal phrase "Upon my command you shall explode" combined with (b) an up-down stroke of the magic wand followed by a forward-thrust stroke of the magic wand, such that (c) the up-down stroke of the wand is imparted simultaneously with the utterance of the word "my" in the verbal phrase and the forward-thrust stroke is imparted simultaneously with the utterance of the final syllable of the word "explode" in the verbal phrase; This may be stored in memory using many forms of notation and/or encryption. In one simple method, the verbal phrase is stored in memory as written text, the manual gestures are stored in memory as a listing of identifiable manual strokes such as the ones described previously, and the coordination of the onset of a particular syllable with the onset of a particular stroke are stored in memory as a pointer from a variable storing a particular syllable of a particular word to a variable storing a manual stroke that is to be synchronized with it. As a short hand for describing such verbo-manual gestures, for example for conveying the form of various verbo-manual gestures to users, a simple method is to write a first line of text with the verbal phrase and second line of text below it with the manual strokes such that when a particular syllable is coordinated with a particular manual stroke, it appears directly over the name of that stroke:

Upon my command you shall explode.
up-down forward-thrust

Thus the above verbo-manual gesture is defined as the verbal phase "upon my command you shall explode," combined with an up-down stroke of the wand simultaneously performed with the utterance of the word "my" and a forward-thrust stroke performed simultaneously with the utterance of the first syllable of the word "explode." If a user successfully performs the gesture by correctly uttering the phrase and correctly issuing the manual gestures and correctly coordinating the timing of the particular words and syllables with the particular manual strokes, the control system will identify the particular verbo-manual gesture performed by the user, will identify that it was performed correctly, and will issue an associated command to one or more electronic devices. In this particular example, the associated command causes an action to be taken in the entertainment application, causing the particular object that the user was then currently interacting with in the simulation to explode upon the screen. In one embodiment, the command that is issued to the electronic device may be dependent upon one or more performance characteristics of the verbal utterance and/or the manual gesture. For example, the volume or speed of the utterance can be quantified by the speech recognition routines and used to qualify how the command is issued. Similarly, the magnitude or speed of the manual gesture can be quantified by the gesture processing routines and used to qualify how the command is issued. In this particular example, the magnitude of the acceleration spike imparted when the user performs the final forward-thrust stroke is used to compute the magnitude of the explosion that is imparted within the entertainment simulation. In this way the use not only selects and imparts a particular explosion command by issuing the verbo-manual gesture, the user also imparts a desired magnitude of the explosion command. In other common embodiments, the magnitude of a particular command may also be dependent upon the volume of the user's voice when issuing the verbal phrase. In other embodiments, the length of time that a manual gesture is continued, such as circling a wand in a circle-clockwise or circle-counterclockwise command, is used to affect the quality or magnitude of a command issued to one or more electronic devices. Here is an example of such a-verbo-manual gesture:

A verbo-manual gesture is defined in a particular embodiment of the present invention as the verbal phase "I wave my wand to drop the lights and turn this day into night," combined with an up-down stroke of the wand-shaped manipulandum simultaneously performed with the utterance of the word "wave" and a left-right stroke of the wand simultaneously performed with the utterance of the word "lights" and finally a circle-clockwise stroke of the wand performed simultaneously with the utterance of the word "night" and continuing for as long as the user desires. If a user successfully performs the gesture by correctly uttering the phrase and correctly issuing the manual gestures and correctly coordinating the timing of the particular words and syllables with the particular manual strokes, the control system will identify the particular verbo-manual gesture performed by the user, will identify that it was performed correctly, and will issue an associated command to one or more electronic devices. In this particular example, the associated command causes an electronic device, such as a home network control computer, to dim the lights in the room that the user is currently standing in, the amount of dimming that is performed being dependent upon the length of time that the user keeps performing the circle-clockwise stroke. In this way the use not only selects and imparts a particular command upon the electronic device that controls the lights of his or her house by issuing the verbo-manual gesture, the user also imparts a desired magnitude of the dimming command. Such a command may be represented in shorthand as follows:

I wave my wand to drop the lights and turn this day into night
up-down left-right circle-clockwise Finally, it should be noted that the verbal component of a verbo-manual gesture need not be a real word in any particular language, but may be a made-up word such as those often used in imaginary incantations. Furthermore it should be noted that some commands may be dependent upon user-inserted words. For example, a verbo-manual gesture that is linked to a command that causes a particular piece of music to be played by an electronic device may be structured to allow the user to say the name of that particular piece of music as part of the command to specify it. In this way the user can make specific commands that are customized in content by inserting names or other identifiers that refer to specific items into a predetermined place within the verbal utterance structure.

Some embodiments of the present invention include an additional means for users to convey input to the system such as a button, trigger, lever, switch, or other finger manipulatable object mounted upon the manipulandum. In such embodiments that include one or more finger manipulatable objects mounted upon the manipulandum, verbo-manual gestures may include an additional component, the additional component requiring the user to engage the finger manipulatable object in a specified way while delivering the combined verbal utterance / manual gesture. For example, in addition to uttering an incantation and imparting manual strokes of a wand-shaped interface, the user may also be required to press a button on the wand during the verbo-manual gesture for the gesture to be recognized as successfully delivered. In more sophisticated embodiments the button press (or other similar finger manipulation) may be required in time-synchronization with a portion of the verbal utterance and/or a portion of the gestural manipulation of the manipulandum.

As shown in FIG. 1, one embodiment of the present invention includes a wand-shaped manipulandum 10 fitted with one or more sensors for detecting user induced motions. More specifically, FIG. 1 shows a manipulandum comprised of a wand-shaped housing formed with a handle end 12 for engagement by the hand of user and a tip end 16 that is waved about by the user to impart manual gestures. Also included is an orientation identifier 14 which is a visible detent, bump, sticker, dot, or other identifiable marking that allows the user to know which side of the wand-shaped manipulandum should point upward when held in the user in known a home-position. In other embodiments the shape of housing itself can be used to indicate the orientation in which the wand should be held in the hand of the user. While the manipulandum can take many forms, one embodiment is the form of a magic wand such that the user can wield the wand and perform simulated magic incantations as a means of interacting with one or more electronic devices.

Figure 2:
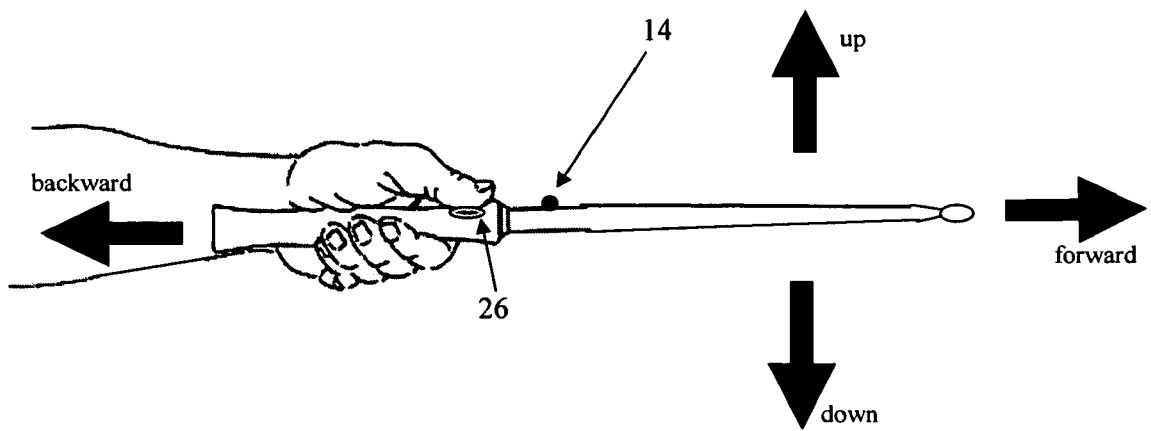
FIG. 2 illustrates a wand-shaped manipulandum as held by a user.

FIG. 2 shows one embodiment of the present invention being held in the hand of a user. As shown in the figure, the user grips the wand-shaped enclosure around the handle portion and points the tip portion away from his or her body. As shown, the wand-shaped manipulandum is held level and pointed forward and away from the body. This configuration is referred to herein as the "home position". When the wand is held in this home position, the orientation identifier 14 should point upward. This is a simple calibration method that ensures that the acceleration sensors are oriented in a known configuration with respect to the floor of the user's local environment and with respect to left and right side of the user's body. Also shown in the figure are four large arrows, labeled "up", "down", "forward", and "backwards" to show the up, down, forward, and backwards directions of motion that a user can move the wand with respect to his or her body. Not shown in the figure are the "left" and "right" directions of motion that the user can also move the wand relative to his body. Also shown in the figure is an optional finger manipulatable switch 26 that the user can engage as an additional means of providing input to the system. The switch could alternatively be a button, lever, trigger, dial, wheel, or other finger manipulatable control.

Figure 3:
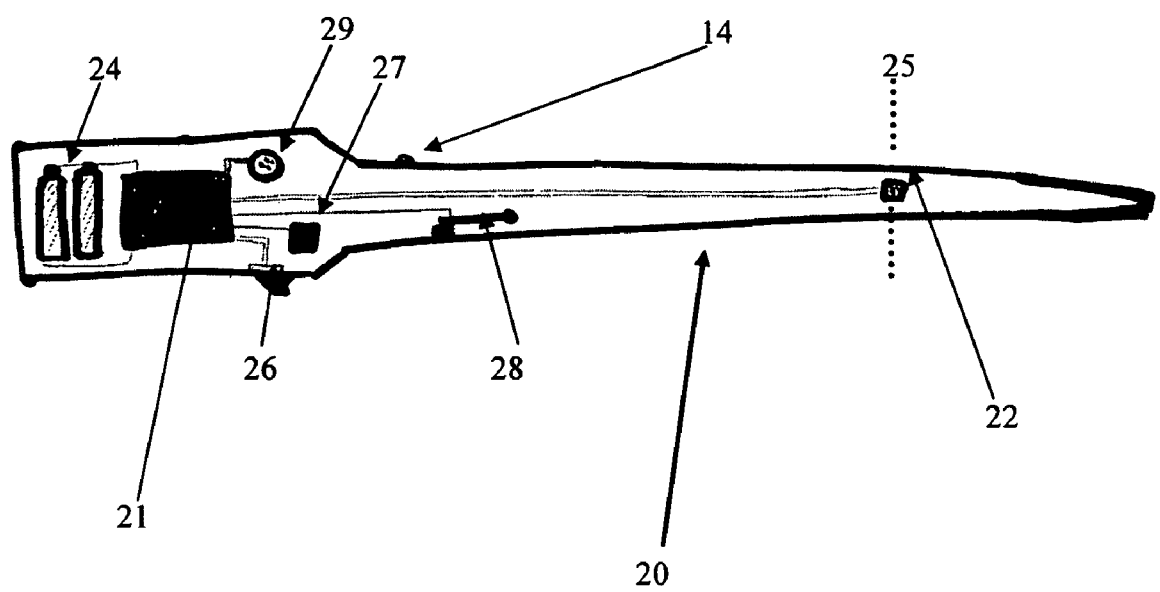
FIG. 3 illustrates a schematic of a sensor-equipped manipulandum in accordance with one embodiment of the present invention.

FIG. 3 shows a schematic of one embodiment of a sensor-equipped manipulandum consistent with the present invention. The manipulandum includes one or more sensors for detecting the gestural motion imparted by the user. The embodiment shown here includes a multi-axis accelerometer 22 for detecting accelerations induced by the user in multiple directions while performing manual gestures with the manipulandum. The accelerometer is located near the tip end of the wand-shaped manipulandum because that end will experience the highest accelerations when wielded by a user. The embodiment shown here also includes local control electronics 21 for capturing accelerometer data and for overseeing the communication with one or more electronic devices. In many embodiments the control electronics includes a local processor that runs firmware, the firmware including code for coordinating communication with the one or more electric devices. In one embodiment the one or more electronic device includes a personal computer that the manipulandum is interfaced with. The local control electronics can perform multiple functions, for example acting as signal conditioning electronics for storing, filtering, processing, or otherwise manipulating sensor data prior to communicating with one or more host electronic devices. The local control electronics can in some embodiments also act as control system electronics, performing some or all of the analysis of the sensor data to determine the type and typing of manual gestures imparted by the user. In other embodiments the analysis of the sensor data is performed on the one or more electronic devices.

In addition, the manipulandum includes a wired or wireless communication link for communicating with one or more electronic devices. In one embodiment, the communication link is a wireless link. In FIG. 2 the communication link is a radio frequency communication interface or RF communication link. To support this link the manipulandum includes a radio transceiver shown in the figure as 28. In some embodiments the RF communication link is output only, allowing the manipulandum to send data to one or more electronic devices. In other embodiments the RF communication link is bidirectional, allowing the manipulandum to receive and send data with one or more electronic devices. In one embodiment the RF communication link is a Bluetooth Communication link that follows a standard protocol for communication with one or more electronic devices.

With respect to the multi-axis accelerometer 22 mounted to the plastic housing 20 of the wand, care is taken to orient axes of the multi-axis sensor in known directions with respect to the housing. In the present embodiment, the Y-AXIS sensor of the multi-axis sensor is oriented such that it will point straight up when the wand is held level and the orientation identifier 14 is on top. The direction of sensing of the Y-AXIS sensor is shown in FIG. 3 as the dotted line marked Y-AXIS 25. The additional axes of sensing, namely X-AXIS which extends into and out of the page, and Z-AXIS which extends along the length of the wand, are not shown in the figure.

Also included in the manipulandum shown are batteries 24. The batteries are only required in wireless embodiments, for wired embodiments can receive power over the communication tether. The batteries are used to power the control electronics, sensors, and other electronic components within the manipulandum. In some embodiments the batteries are rechargeable batteries. In some embodiments the wand is stored in a docking station such that the rechargeable batteries are charged from electric power provided by the docking station. In some advanced embodiments of the present invention, the manipulandum includes a user-powered generator such as an inertial motion generator that charges the batteries based upon the inertial motion imparted by the user upon the manipulandum. Such a generator will extend battery life between charges or eliminate the need to for recharging. An example technology for converting inertial motion to electrical energy is disclosed in U.S. Pat. No. 4,091,302 entitled "Portable piezoelectric electric generating device" which is hereby incorporated by reference. Another example technology for converting inertial motion to electrical energy is disclosed in U.S. Pat. No. 6,858,970 entitled "Multi-frequency piezoelectric energy harvester" which is also hereby incorporated by reference. Another example technology for converting inertial motion to electrical energy is disclosed in U.S. Pat. No. 6,244,742 which is also hereby incorporated by reference. Some embodiments of the present invention include one or more LEDs or other display means for indicating the charge level and/or for indicating whether or not the manipulandum batteries are sufficiently charged, fully charged, partially charged, and/or insufficiently charged.

As shown in FIG. 3, the manipulandum may also include one or more finger operated elements for detecting a finger engagement by the user upon a surface of the wand-shaped manipulandum. Finger depressible switch 26 is such a finger operated element and allows the user to provide additional input to the control electronics and/or to the one or more electronic devices the control electronics is communicating with. In some embodiments, as described previously, the finger press of a switch or button is used as an additional component of a verbo-manual gesture that is time-synchronized with one or more verbal utterances and/or one or more components of the manual gesture.

As described previously, the inventive system disclosed herein includes a microphone for capturing verbal utterances from the user. In some embodiments the microphone is mounted within the manipulandum itself, usually behind an opening in the plastic housing to allow sound signals to reach it. As shown in FIG. 3, a microphone 29 is mounted within the handle portion of the manipulandum in a location that will not be covered by the hand of the user but which is near to the user-side of the manipulandum and oriented on the upper surface closer to the direction from which user utterances will come. The microphone, in this particular embodiment, is connected directly to the local control electronics. The local control electronics includes an analog to digital converter for converting the analog audio signal produced by the microphone to a digital signal that can be stored in digital memory and/or sent over a digital communication link. In some embodiments of the present invention the local control electronics processes the audio signal as well, filtering it and/or performing noise reduction upon it. In some embodiments of the present invention the local control electronics will also perform speech recognition upon the signal using speech recognition software routines stored in the memory of the control electronics. In other embodiments of the present invention the audio signal, or a representation thereof, is sent to another electronic device, a personal computer, over the communication link, for speech recognition processing and/or other processing.

Also included in some embodiments of the present invention is an RFID chip 27 as shown in FIG. 3. This chip allows the manipulandum to identify itself when brought within range of one or more electronic devices equipped with RFID scanners. This is be particularly useful in allowing the manipulandum to connect with a plurality of different electronic devices for entertainment or other applications, the electronic devices identifying the particular ID of the particular manipulandum, and controlling the functions or operations of the electronic devices accordingly. This is also useful in allowing a plurality of different manipulandum to function with a plurality of different electronic devices, allowing the electronic devices to keep track of which manipulandum has caused which action, especially when manipulandum are mobile and may come and go from the vicinity of the electronic devices at the will of their operators. A variety of RFID chip technologies are available for serving this function, for example the SRIX4K Smartcard Chip available from STMicroelectronics. The chip contains a 4096-bit user EEPROM fabricated with CMOS technology and stores identification data in 128 blocks of 32 bits each. The SRIX4K is accessed via the 13.56 MHz carrier. Incoming data are demodulated and decoded from the received amplitude shift keying (ASK) modulation signal and outgoing data are generated by load variation using bit phase shift keying (BPSK) coding of an 847 kHz sub-carrier. The use of such chips to create RFID enabled devices is disclosed in U.S. Patent Applications 20030132301 and 20040124248, both of which are hereby incorporated by reference.

The present invention provides a variety of ways for distributing the processing load to (a) store verbo-manual gesture definitions in memory along and link them to particular control commands to be performed by one or more electronic devices, (b) to processes verbo-manual gestures provided by a user as a stream of audio data and manual gesture data to determine if a particular (i.e., reference) verbo-manual gesture was performed and if it was performed correctly, and (c) to interact with one or more electronic devices if and when a verbo-manual gesture was correctly performed, identified, and an associated control command requires implementation by one or more electronic devices. In some embodiments of the present invention the local control electronics on board the manipulandum performs all of these functions, storing verbo-manual gesture definitions, processing incoming verbo-manual gestures from users, and controlling one or more electronic devices accordingly through a communication link. In other embodiments, the processing functions are shared between the local control electronics and another electronic device, such as a personal computer or handheld computer. When the other device is a personal computer or handheld computer is used to share this processing burden, performing significant aspects of (a), (b), and (c) above, it is often referred to as a host computer. In many embodiments, the host computer is a personal computer running control system software routines. In some of the embodiments, the host computer is a gaming system running gaming software. In other embodiments, the host computer is a handheld computer that is kept local to the user of the manipulandum, such as in his or her pocket or worn on his or her belt. In some embodiments the handheld computer is a portable gaming system that runs gaming software and interfaces with the local control electronics of the manipulandum.

One use of the current invention involves multi-player entertainment applications in which each player wields a wand and utters magical incantations as a means of interacting with other players. In some such embodiments, each of the players has a wand that is connected by wired or wireless link to a portable gaming system that is located on their person, such as worn on their belt or held in their pocket. The players are engaged in a multi-player gaming scenario, their portable gaming systems communicating with each other over a wireless link such as a Bluetooth communication connection or other communication connection. In some embodiments, other sensors are used to enable the multi-player entertainment system, including GPS sensors, RFID sensors, and/or other location and/or proximity detecting sensors. When two players are in close proximity, each with their own wand interfaced with their own portable gaming system, they may engage in a wand-based battle or other wand-based competition, casting spells at each other using the verbo-manual gesture methods and apparatus disclosed herein. In some embodiments of the present invention, when one user successfully delivers a verbo-manual gesture associated with a particular magical entertainment function that causes a damaging effect upon another user, software is updated in the gaming system that records the damage by reducing health points, increasing damage points, or otherwise updating variables that represent the state of health of that user and/or other states of the entertainment environment. In such systems, a plurality of users can engage in a magical battle using their wands to cast magical spells on one and other, the magical spells being associated with particular verbo-manual gestures and being imparted when a user successfully performs the particular verbo-manual gestures, the effect of those spells causing updates in the entertainment software related to the effect of those spells. In such systems, a user wielding a wand and performing verbo-manual gestures may be awarded points for successfully performing magical wand-based functions, such as for imparting damage to an opponent or otherwise obstructing the opponent from reaching some shared goal. For entertainment systems that include a plurality of users using a plurality of wand-based manipulandum devices, RFID chips as described previously, may be used to identify verbo-manual gesture related commands issued by particular users.

Thus, embodiments of the present invention may be implemented in entertainment applications wherein a wand-shaped manipulandum represent a "magic wand" that is used by the user to perform simulated magical acts. In such applications the present invention enables a realistic "magic wand" type experience for the user such that the user can cause simulated magical acts to happen within the entertainment application by "casting a spell" that requires a the user to issue a particular verbal utterance correlated in time with a particular manual gesture imparted upon the wand-shaped manipulandum. In this way, the unique correlation of manual gesture recognition and vocal speech recognition as disclosed herein, provides a unique immersive and realistic "magic wand" based entertainment experience. That the, the current invention can also be used to perform non-gaming functions, such as controlling electronic appliances in one's house, turning on and off lights, adjusting music being played, sending a message to another person, or otherwise interacting generally with one or more electronic devices based upon verbo-manual gestures correctly performed.

As mentioned above, a wide range of sensors may be used to track the location, orientation, and/or motion of the manipulandum. Sensors for tracking manual gestures as described herein may be implemented as accelerometers. It will be appreciated that accelerometers do not provide absolute directional information but do provide relative directional information. Accordingly, accelerometers may be used in combination with other sensors that provide absolute directional information such as magnetometers and/or GPS sensors. As an example, a magnetometer may be included within a manipulandum to provide information about the absolute direction the user is pointing or moving the wand while performing a verbo-manual gesture. GPS sensors and/or other sensors may be similarly used. Systems that use sophisticated sensors for tracking the position and orientation of a user interface device in a spatial environment is disclosed in U.S. Patent Applications 20030193572 and 20030011467 which are hereby incorporated by reference.

Some embodiments of the present invention may also include a speaker or other sound generation device mounted within the housing of the manipulandum. Such a speaker or other sound generation device may be used to provide audio feedback to the user of the state or status of the system and/or the state or status of one or more electronic devices that the user is interacting with through the manipulandum.

Figure 4:
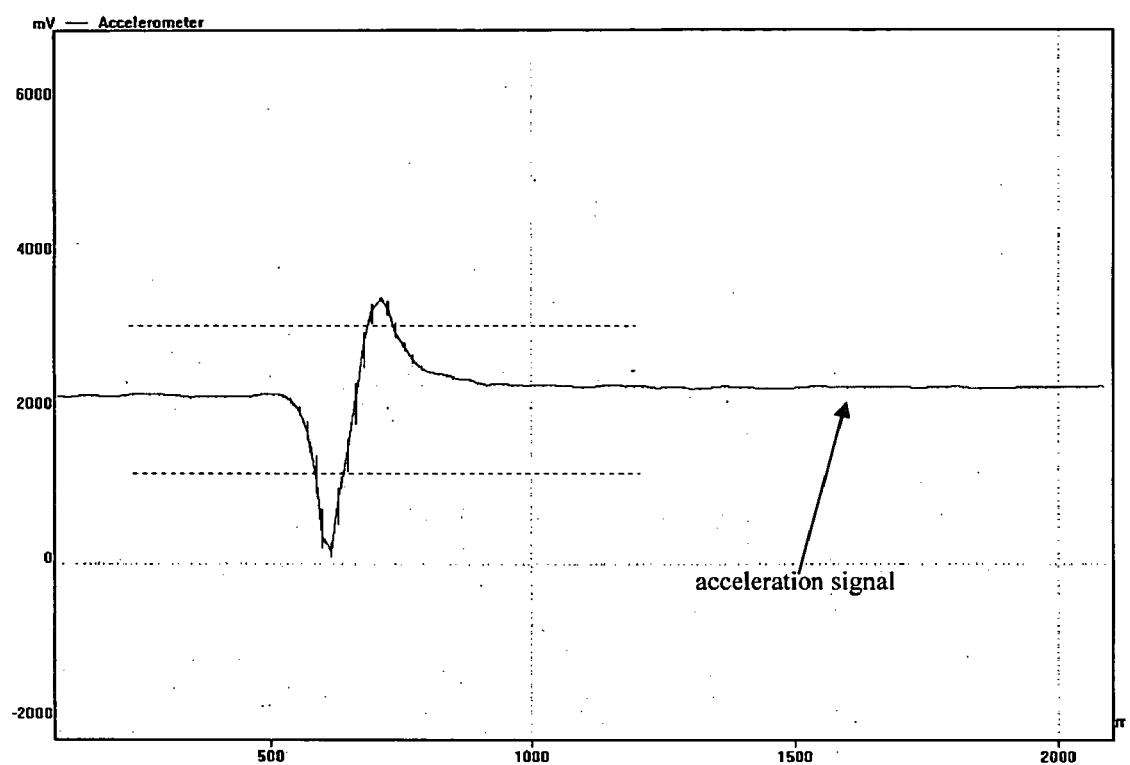
FIG. 4 illustrates data collected by a Y-AXIS accelerometer of a manipulandum when a user performs a down-stroke in accordance with one embodiment of the present invention.

FIG. 4 illustrates data collected by a Y-AXIS accelerometer of a manipulandum when a user performs a down-stroke in accordance with one embodiment of the present invention.

Referring to FIG. 4, the data has been collected when a user performs a basic down-stroke with the interface, the down-stroke being a downward motion imparted by the user upon the manipulandum such that it is drawn downward in a smooth quick motion towards the floor. As shown in the figure, the down-stroke is identified by a characteristic pattern comprising a downward acceleration spike followed by an upward acceleration spike. This pattern is the result of the user first accelerating the manipulandum downward and then slowing the manipulandum back to rest by imparting upward acceleration, the downward acceleration spikes and upward acceleration spikes being determined by control system software identification routines of the present invention by comparing the data signal to defined downward and/or upward threshold levels. The lower dotted line drawn in the figure represents a downward threshold level that must be negatively exceeded by the data profile for the control system software identification routine to recognize the downward spike. The upper dotted line drawn in the figure represents an upward threshold level.

Figure 5:
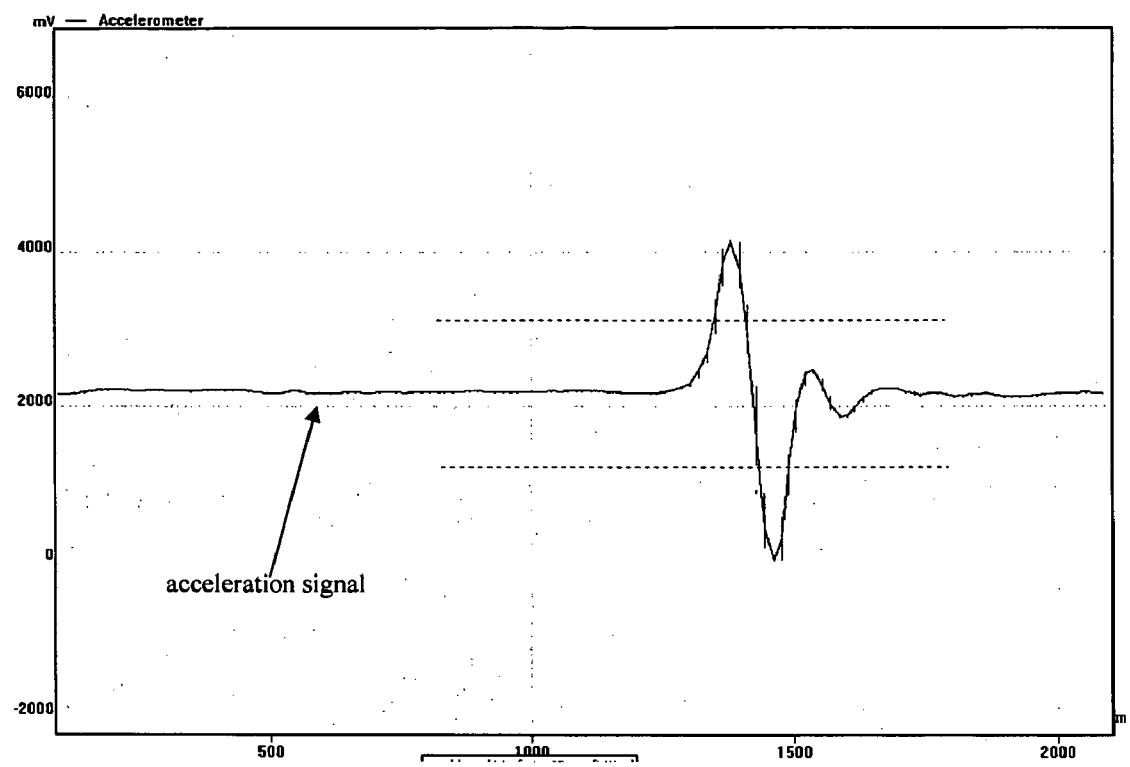
FIG. 5 illustrates data collected by a Y-AXIS accelerometer of a manipulandum when a user performs an up-stroke in accordance with one embodiment of the present invention.

FIG. 5 illustrates data collected by a Y-AXIS accelerometer of a manipulandum when a user performs an up-stroke in accordance with one embodiment of the present invention.

Referring to FIG. 5, the data has been collected when a user performs a basic up-stroke with the interface, the up-stroke being an upward motion imparted by the user upon the manipulandum such that it is raised upward in a smooth quick motion. As shown in the figure, the up-stroke is identified by a characteristic pattern comprising an upward acceleration spike followed by a downward acceleration spike. This pattern is the result of the user first accelerating the manipulandum upward and then slowing the manipulandum back to rest by imparting downward acceleration, the upward acceleration spikes and downward acceleration spikes being determined by control system software identification routines of the present invention by comparing the data signal to defined upward and/or downward threshold levels. The lower dotted line drawn in the figure represents a downward threshold level. The upper dotted line drawn in the figure represents an upward threshold level.

Figure 6:
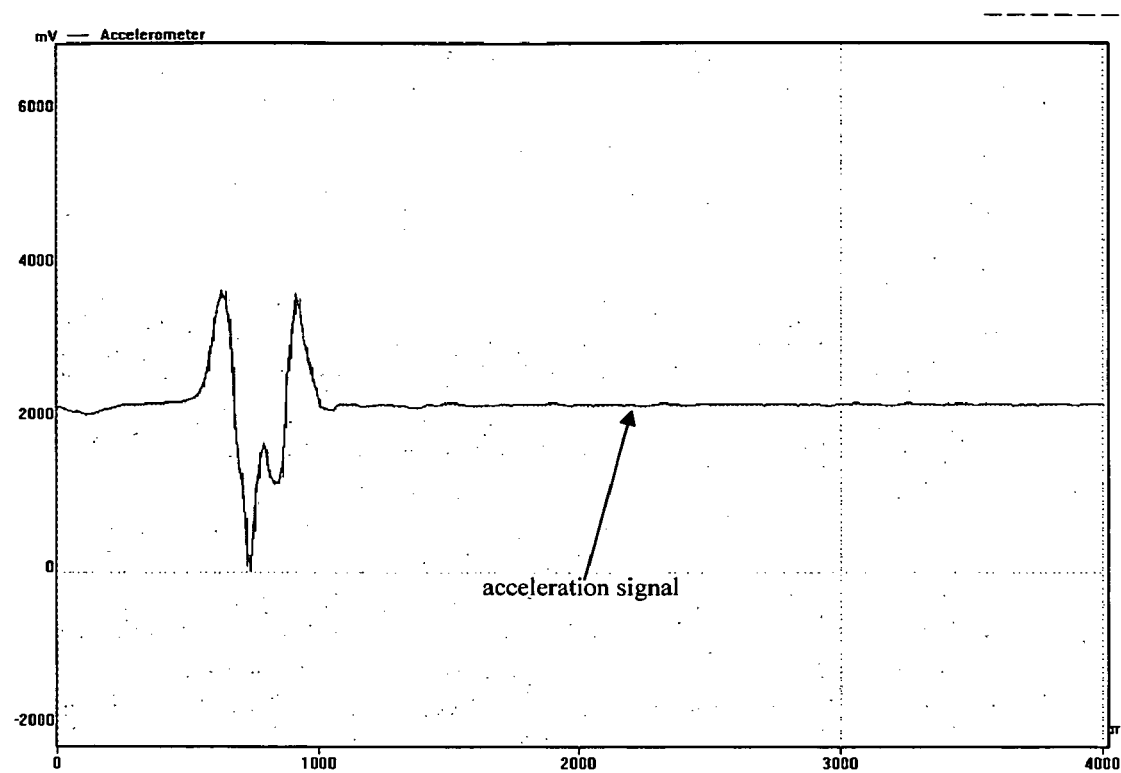
FIG. 6 illustrates data collected by a Y-AXIS accelerometer of a manipulandum when a user performs an up-down stroke in accordance with one embodiment of the present invention.

FIG. 6 illustrates data collected by a Y-AXIS accelerometer of a manipulandum when a user performs an up-down stroke in accordance with one embodiment of the present invention.

Referring to FIG. 6, the data has been collected when a user was performing a basic up-down stroke, the up-down stroke being a motion imparted by the user upon the manipulandum such that is waved by the user in an up-down motion, first moving upward and then moving downward. In this example, the up-down stroke is identified by control system software routines as a characteristic pattern comprising an upward acceleration spike followed by a downward acceleration plateau, followed by another upward acceleration spike as shown in the figure. Threshold levels are used as described previously but are not shown in the figure.

Figure 7:
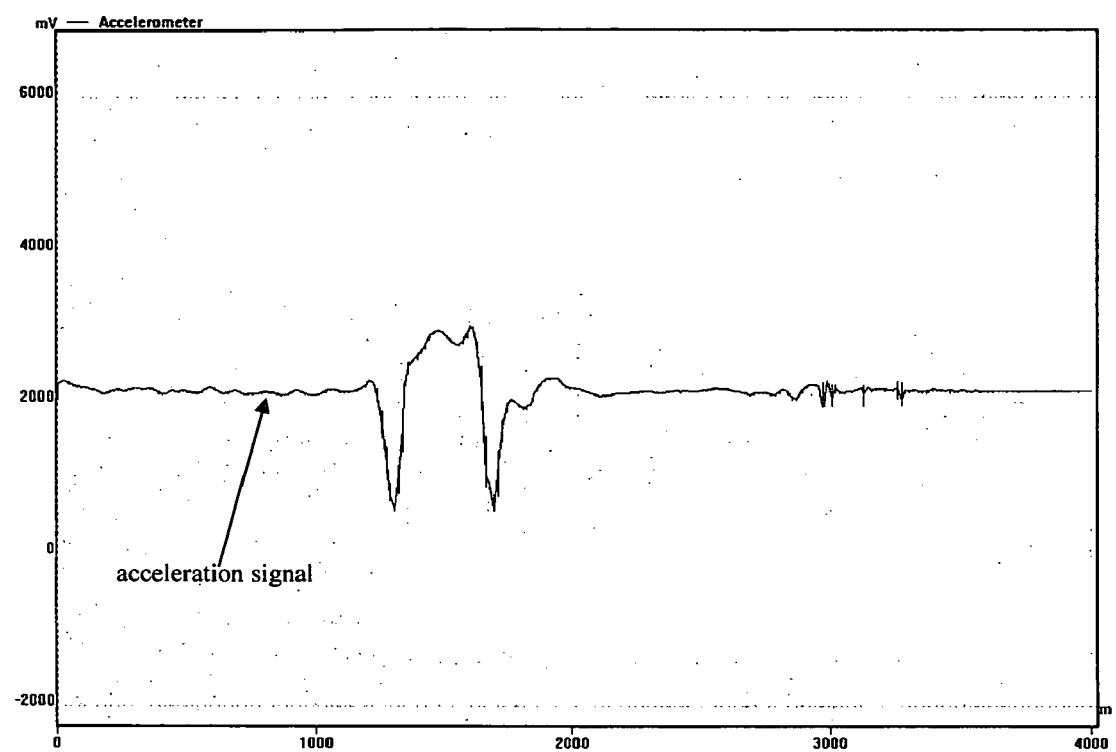
FIG. 7 illustrates data collected by a Y-AXIS accelerometer of a manipulandum when a user performs a down-up stroke in accordance with one embodiment of the present invention.

FIG. 7 illustrates data collected by a Y-AXIS accelerometer of a manipulandum when a user performs a down-up stroke in accordance with one embodiment of the present invention.

Referring to FIG. 7, the data has been collected when a user was performing a basic down-up stroke, the down-up stroke being a motion imparted by the user upon the manipulandum such that is waved by the user in an down-up motion, first moving downward and then moving upward. In this example, the down-up stroke is identified by control system software routines as a characteristic pattern comprising an downward acceleration spike followed by an upward acceleration plateau, followed by another downward acceleration spike as shown in the figure. Threshold levels are used as described previously but are not shown in the figure.

Figure 8:
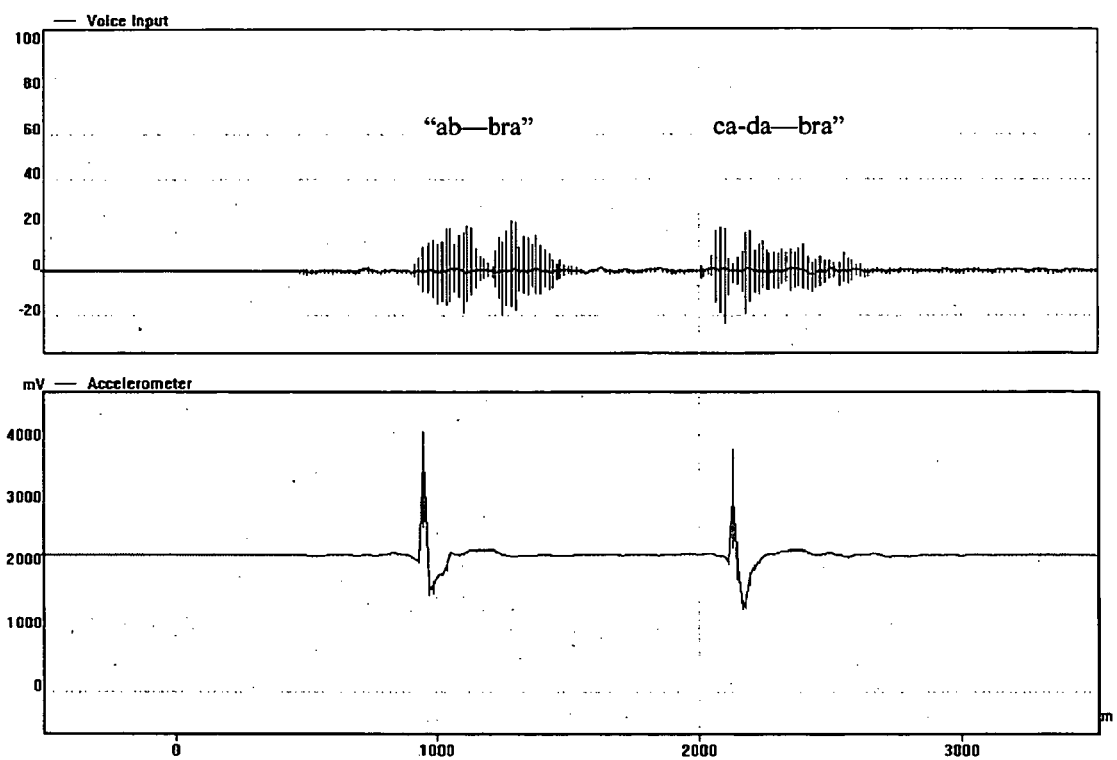
FIG. 8 illustrates input data collected when a user utters an exemplary phrase "bra Cadabra" while waving a manipulandum in accordance with one embodiment of the present invention.

FIG. 8 illustrates input data collected when a user utters an exemplary phrase "Abra Cadabra" while waving a manipulandum in accordance with one embodiment of the present invention.

Referring to FIG. 8, the input data collected by one embodiment of the present invention as a user utters the phase "Abra Cadabra" while waving a sensored wand in a synchronized verbo-manual gesture. As shown in the figure, the upper plot is raw microphone data representing the captured verbal utterance of the phase. This plot shows two distinct words separated in time, each represented by a distinct signal burst. The first burst starts around 1000 ms and the second burst starts around 2000 ms. The first burst represents the two syllable word "Abra." The second burst represents the three syllable word "Cadabra." Also shown in the figure is a lower plot that represents raw accelerometer data from the Y-AXIS of an accelerometer mounted within the wand consistent with some embodiments of the present invention. The data stream shows two acceleration spikes, a first spike occurring just before 1000 ms and the second spike occurring just after 2000 ms. The first spike was caused by an up stroke of the wand by the user that was substantially simultaneous in time with his utterance of the first syllable of the word, "Abra." The second spike was caused by an up stroke of the wand by the user that was substantially simultaneous in time with his utterance of the first syllable of the word "Cadabra". By substantially simultaneous it is meant that the two occurrences happen simultaneously in time with a margin of error that is less than 200 milliseconds as determined by analysis routines performed by the control system of the present invention. Such a margin of error is barely noticeable within the context of the human perceptual system and is therefore perceived by the user as substantially simultaneous. As described above, the identification of the time varying audio signal as actual phonemes, syllables, and/or words is performed by speech recognition software routines that are known to the art.

Figure 9:
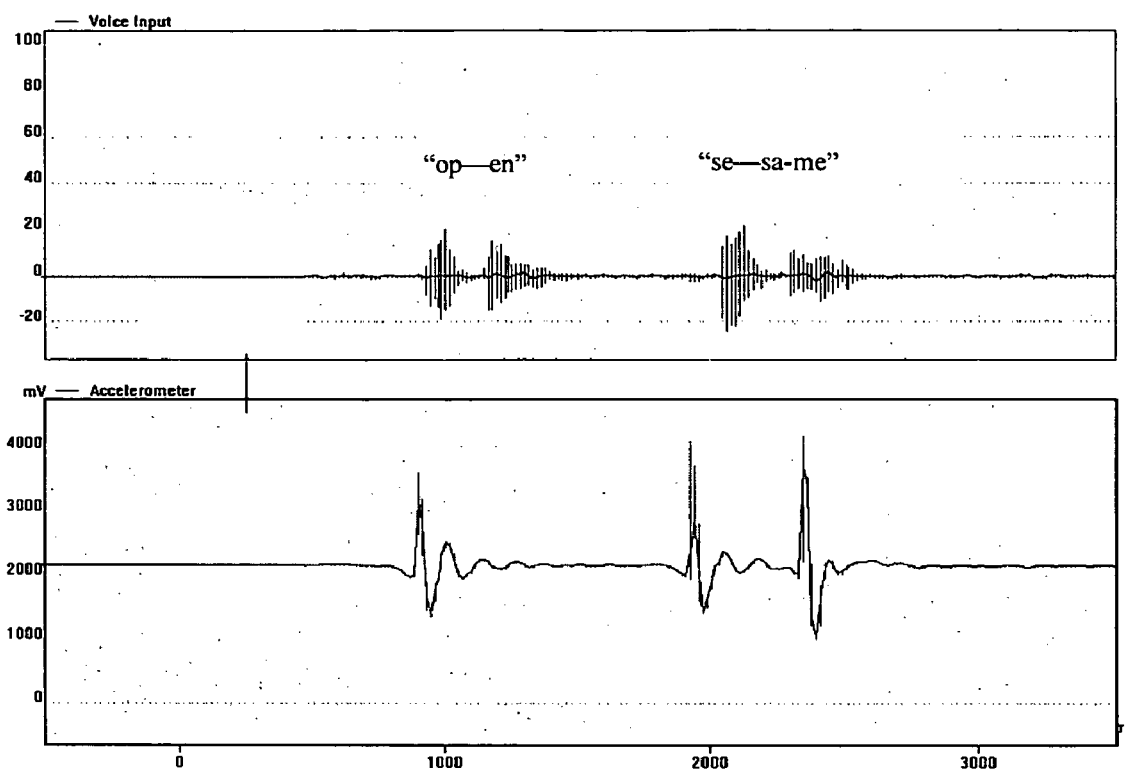
FIG. 9 illustrates input data collected when a user utters an exemplary phrase "Open Sesame" while waving a manipulandum in accordance with another embodiment of the present invention.

FIG. 9 illustrates input data collected when a user utters an exemplary phrase "Open Sesame" while waving a manipulandum in accordance with another embodiment of the present invention.

Referring to FIG. 9, the upper plot is raw microphone data representing the captured verbal utterance of the phase. This plot shows two distinct words separated in time, each represented by a distinct signal burst. The first burst starts around 1000 ms and the second burst starts around 2000 ms. The first burst represents the two syllable word "Open." The second burst represents the three syllable word "Sesame." Also shown is a lower plot of accelerometer data from the Y-AXIS of an accelerometer mounted within the wand consistent with some embodiments of the present invention. The data shows three acceleration spikes, a first spike occurring just before 1000 ms, the second spike occurring just before 2000 ms, and the third spike occurring around 2400 milliseconds. The first spike was caused by an up stroke of the wand by the user that was substantially simultaneous in time with his utterance of the first syllable of the word "Open." The second spike was caused by an up stroke of the wand by the user that was substantially simultaneous in time with his utterance of the first syllable of the word "Sesame". The third spike was caused by an up stroke of the wand by the user that was substantially simultaneous in time with his utterance of the third syllable of the word "Sesame". Thus in this particular verbo-manual gesture, there are two stokes coordinated in time with the utterance of the single word Sesame, a stroke on the first syllable and a stroke on the third syllable. By substantially simultaneous it is meant that the two occurrences happen simultaneously in time with a margin of error that is less than 200 milliseconds as determined by analysis routines performed by the control system of the present invention. Such a margin of error is barely noticeable within the context of the human perceptual system and is therefore perceived by the user as substantially simultaneous.

Figure 10:
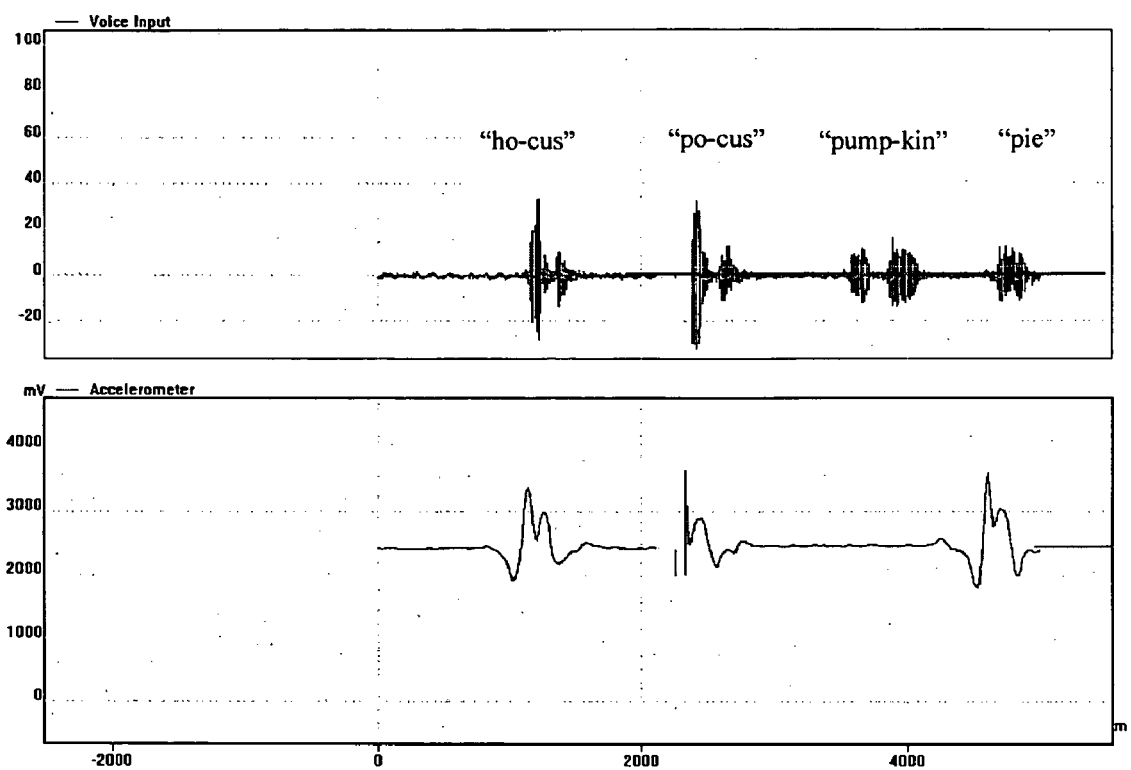
FIG. 10 illustrates input data collected when a user utters an exemplary phrase "Hocus Pocus Pumpkin Pie" while waving a manipulandum in accordance with another embodiment of the present invention.

FIG. 10 illustrates input data collected when a user utters an exemplary phrase "Hocus Pocus Pumpkin Pie" while waving a manipulandum in accordance with another embodiment of the present invention.

Referring to FIG. 10 the upper plot is raw microphone data representing the captured verbal utterance of the phase. This plot shows four distinct words separated in time, each represented by a distinct signal burst. Also shown is a lower plot of accelerometer data from the Y-AXIS of an accelerometer mounted within the wand consistent with some embodiments of the present invention. The data shows three acceleration spikes, a first spike caused by an down-up stroke of the wand by the user that was substantially simultaneous in time with his utterance of the first syllable of the word "Hocus," a second spike caused by an down-up stroke of the wand by the user that was substantially simultaneous in time with his utterance of the first syllable of the word "Pocus," and a third spike caused by an down-up stroke of the wand by the user that was substantially simultaneous in time with his utterance of the word "Pie." Thus in this particular verbo-manual gesture, there are manual wand stokes coordinated in time with some words of the phrase but not all words. Here the word pumpkin is uttered without any manual stroke associated with it. This demonstrates that successfully enacted verbo-manual gestures may be defined with a wide range of coordination parameters, the onset of some words or syllables being synchronized with manual motions and other words or syllables not being synchronized with any manual motions. Similarly, some verbo-manual gestures may be defined such that one or more manual strokes are coordinated with one or more specific moments of silence within the verbal utterance.

While the invention herein disclosed has been described by means of specific embodiments, examples and applications thereof, numerous modifications and variations could be made thereto by those skilled in the art without departing from the scope of the invention set forth in the claims.

What is claimed is:

1. A verbo-manual gesture interface system, comprising:
    a manipulandum adapted to be movable according to a multi-stroke manual gesture imparted by a user, the multi-stroke manual gesture comprising a plurality of characteristic manual strokes;
    a sensor adapted to detect each of the plurality of characteristic manual strokes within the multi-stroke manual gesture imparted to the manipulandum and to generate a sensor signal representing the timing of each of the plurality of characteristic manual strokes within the multi stroke manual gesture;
    a microphone adapted to detect a spoken phrase uttered by the user, the spoken phrase including a plurality of uttered words spoken by the user and to generate an utterance signal representing the timing of each of the plurality of uttered words within the spoken phrase; and
    a control system adapted to receive the generated sensor signal and the generated utterance signal and to transmit a command signal to at least one electronic device, the command signal being dependent, at least in part, upon a predetermined temporal relationship between a particular one of the plurality of characteristic manual strokes within the multi-stroke manual gesture and a particular one of the plurality of uttered words within the spoken phrase,
    wherein the predetermined temporal relationship requires that the particular one of the plurality of characteristic manual strokes within the multi-stroke manual gesture is imparted with substantial simultaneity with the particular one of the plurality of uttered word within the spoken phrase.

2. The system of claim 1, wherein the control system transmits the command signal on further dependence upon a second predetermined temporal relationship between a second one of the plurality of characteristic manual strokes within the multi-stroke manual gesture and a second one of the plurality of uttered words within the spoken phrase.

3. The system of claim 2, wherein the predetermined temporal relationship requires that the second one of the plurality of characteristic manual strokes within the multi-stroke manual gesture is imparted with substantial simultaneity with the second one of the plurality of uttered word within the spoken phrase.

4. The system of claim 1, wherein the sensor comprises an accelerometer.

5. A verbo-manual interface method, comprising the steps of:
    detecting each of a plurality of characteristic manual strokes within a multi-stroke manual gesture imparted to a manipulandum by a user;
    generating a sensor signal representing the timing of each of the plurality of characteristic manual strokes within the multi-stroke manual gesture;
    detecting a spoken phrase uttered by a user, the spoken phrase including a plurality of uttered words spoken by the user;
    generating an utterance signal representing the timing of each of the plurality of uttered words within the spoken phrase; and controlling at least one electronic device in dependence upon a predetermined temporal relationship between a particular one of the plurality of characteristic manual strokes within the multi-stroke manual gesture and a particular one of the plurality of uttered words within the spoken phrase, wherein the controlling step comprises the predetermined temporal relationship requiring that the first manual stroke is imparted with substantial simultaneity with the first spoken word and that the second manual stroke is imparted with a substantial simultaneity with the second spoken word.

6. The method of claim 5, wherein the manual stroke detecting step comprises detecting the multi-stroke manual gesture as at least a first manual stroke and a second manual stroke, and wherein the spoken phrase detecting step comprises detecting the plurality of uttered words as at least a first spoken word and a second spoken word.

7. The method of claim 5, wherein the manual stroke detecting step comprises detecting at least one of the plurality of characteristic manual strokes as one of a circular clockwise stroke and a circular counter-clockwise stroke.

8. The method of claim 5, wherein the manual stroke detecting step comprises detecting at least one of the characteristic manual strokes as one of a forward thrust stroke and a backwards pull stroke.

9. The method of claim 5, wherein the manual stroke detecting step comprises detecting at least one of the characteristic manual strokes by an accelerometer.

10. The method of claim 5, wherein the controlling step comprises controlling the at least one electronic device as a function of a magnitude value generated for at least one of the plurality of characteristic manual strokes.

11. The method of claim 5, wherein the controlling step comprises controlling the at least one electronic device as a function of a volume value generated for at least one of the plurality of uttered words.

12. The method of claim 5, wherein the manual stroke detecting step comprises detecting the multi-stroke manual gesture as at least a first manual stroke and a second manual stroke, wherein the spoken phrase detecting step comprises detecting the plurality of uttered words as at least a first spoken word and a second spoken word, wherein the manual stroke detecting step comprises detecting at least one of the plurality of characteristic manual strokes as one of a circular clockwise stroke and a circular counter clockwise stroke, wherein the manual stroke detecting step comprises detecting at least one of the characteristic manual strokes as one of a forward thrust stroke and a backwards pull stroke, and wherein the manual stroke detecting step comprises detecting at least one of the characteristic manual strokes by an accelerometer.

* * * * *